(12) United States Patent
Georgeson et al.

(10) Patent No.: US 11,053,925 B2
(45) Date of Patent: Jul. 6, 2021

(54) CABLE-SUSPENDED NON-DESTRUCTIVE INSPECTION UNITS FOR RAPID LARGE-AREA SCANNING

(71) Applicant: The Boeing Company, Chicago, IL (US)

(72) Inventors: Gary E. Georgeson, Tacoma, WA (US); Joseph L. Hafenrichter, Auburn, WA (US); Karl E. Nelson, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 16/039,714

(22) Filed: Jul. 19, 2018

(65) Prior Publication Data

US 2020/0025176 A1     Jan. 23, 2020

(51) Int. Cl.
*F03D 17/00*     (2016.01)
*G01N 29/265*     (2006.01)
(Continued)

(52) U.S. Cl.
CPC .......... *F03D 17/00* (2016.05); *G01N 27/902* (2013.01); *G01N 29/265* (2013.01); *F03D 80/50* (2016.05);
(Continued)

(58) Field of Classification Search
CPC .......... F03D 17/00; F03D 80/50; F03D 80/00; G01M 5/0016; G01M 5/0033;
(Continued)

(56) References Cited

U.S. PATENT DOCUMENTS 1,527,632 A * 2/1925 Cromwell .............. A61H 35/00
604/24
3,789,947 A   2/1974 Blumrich
(Continued)

FOREIGN PATENT DOCUMENTS

| JP | 57211551 A | * | 12/1982 | ........... G01N 29/265 |
| JP | 05052821 A | * | 3/1993 | |
| WO | 2011107087 A2 | | 9/2011 | |

OTHER PUBLICATIONS

British Combined Search and Examination Report dated Jan. 7, 2020 in Application No. GB1909931.6 (British counterpart of the instant U.S. patent application).

*Primary Examiner* — Nimeshkumar D Patel
*Assistant Examiner* — Nashmiya S Fayyaz
(74) *Attorney, Agent, or Firm* — Ostrager Chong Flaherty & Broitman P.C.

(57) ABSTRACT

An automated apparatus for large-area scanning of wind turbine blades or other large-bodied structures (such as aircraft fuselages and wings) for the purpose of non-destructive inspection (NDI). One or more vacuum-adhered scanning elements containing NDI sensors are lowered via cables and moved via a motorized cart driven along a leading edge of a horizontally disposed wind turbine blade or via a motorized carriage driven around a track attached to a vertically disposed wind turbine blade. Scan passes are based upon sequenced horizontal and vertical motions of scan heads provided by cart/carriage and cable spool motion. A conformable array of sensors attached to the cart may be used to collect NDI data along the leading edge of a horizontally disposed wind turbine blade if the scan heads cannot reach that area.

20 Claims, 19 Drawing Sheets

(51) Int. Cl.
*G01N 27/9013* (2021.01)
*F03D 80/50* (2016.01)
*G01M 5/00* (2006.01)

(52) U.S. Cl.
CPC ........ *G01M 5/0033* (2013.01); *G01M 5/0075* (2013.01)

(58) Field of Classification Search
CPC ........ G01M 5/0075; G01N 2291/2693; G01N 27/902; G01N 29/043; G01N 29/225; G01N 29/265; Y02E 10/72
USPC .............................................. 73/866.5, 865.5
See application file for complete search history.

(56) References Cited

U.S. PATENT DOCUMENTS

| | | | |
|---|---|---|---|
| 4,146,967 A | 4/1979 | Rohner et al. | |
| 5,031,458 A | 7/1991 | Young et al. | |
| 5,623,107 A | 4/1997 | Patterson, Sr. et al. | |
| 5,657,303 A * | 8/1997 | Namoto | G11B 7/0956 369/100 |
| 5,698,787 A | 12/1997 | Parzuchowski et al. | |
| 6,167,760 B1 | 1/2001 | Brunty et al. | |
| 6,220,099 B1 | 4/2001 | Marti et al. | |
| 6,378,387 B1 | 4/2002 | Froom | |
| 6,829,959 B2 | 12/2004 | Gifford et al. | |
| 7,083,383 B2 | 8/2006 | Loftus et al. | |
| 7,231,826 B2 | 6/2007 | Bossi et al. | |
| 7,240,556 B2 | 7/2007 | Georgeson et al. | |
| 7,315,609 B2 | 1/2008 | Safai et al. | |
| 7,337,673 B2 | 3/2008 | Kennedy et al. | |
| 7,562,593 B2 | 7/2009 | Engelbart et al. | |
| 7,626,383 B1 | 12/2009 | Sun et al. | |
| 7,640,811 B2 | 1/2010 | Kennedy et al. | |
| 7,643,893 B2 | 1/2010 | Troy et al. | |
| 7,716,989 B2 | 5/2010 | Kollgaard | |
| 8,060,270 B2 | 11/2011 | Vian et al. | |
| 8,199,194 B2 | 6/2012 | Troy et al. | |
| 8,347,746 B2 | 1/2013 | Hafenrichter et al. | |
| 8,483,356 B2 | 7/2013 | Bendahan | |
| 8,738,226 B2 | 5/2014 | Troy et al. | |
| 8,743,196 B2 | 6/2014 | Fritz et al. | |
| 8,807,257 B1 | 8/2014 | Hansen et al. | |
| 8,874,371 B2 | 10/2014 | Troy et al. | |
| 8,892,252 B1 | 11/2014 | Troy et al. | |
| 9,156,321 B2 | 10/2015 | Troy et al. | |
| 9,302,787 B2 | 4/2016 | Hafenrichter et al. | |
| 9,481,082 B1 | 11/2016 | Hafenrichter et al. | |
| 9,574,549 B2 | 2/2017 | Lee et al. | |
| 9,643,313 B2 | 5/2017 | Hafenrichter et al. | |
| 2002/0036108 A1 | 3/2002 | Jeswine et al. | |
| 2003/0147493 A1 | 8/2003 | Bueno et al. | |
| 2006/0043303 A1 | 3/2006 | Safai et al. | |
| 2006/0048800 A1* | 3/2006 | Rast | E04G 23/002 134/56 R |
| 2006/0055396 A1 | 3/2006 | Georgeson et al. | |
| 2007/0096727 A1 | 5/2007 | Rempt et al. | |
| 2009/0038398 A1 | 2/2009 | Lavoie et al. | |
| 2010/0011864 A1 | 1/2010 | Hanan et al. | |
| 2010/0132137 A1 | 6/2010 | Eggleston et al. | |
| 2011/0178727 A1 | 7/2011 | Hafenrichter et al. | |
| 2011/0205348 A1 | 8/2011 | Fritz et al. | |
| 2012/0060611 A1 | 3/2012 | Thommen-Stamenkov et al. | |
| 2012/0153032 A1 | 6/2012 | Svanebjerg et al. | |
| 2013/0261876 A1 | 10/2013 | Froom et al. | |
| 2013/0289766 A1 | 10/2013 | Hafenrichter et al. | |
| 2013/0298682 A1 | 11/2013 | Motzer et al. | |
| 2013/0304251 A1 | 11/2013 | Garvey et al. | |
| 2018/0355628 A1* | 12/2018 | Lin | A47L 1/02 |
| 2019/0283821 A1 | 9/2019 | Georgeson et al. | |

* cited by examiner

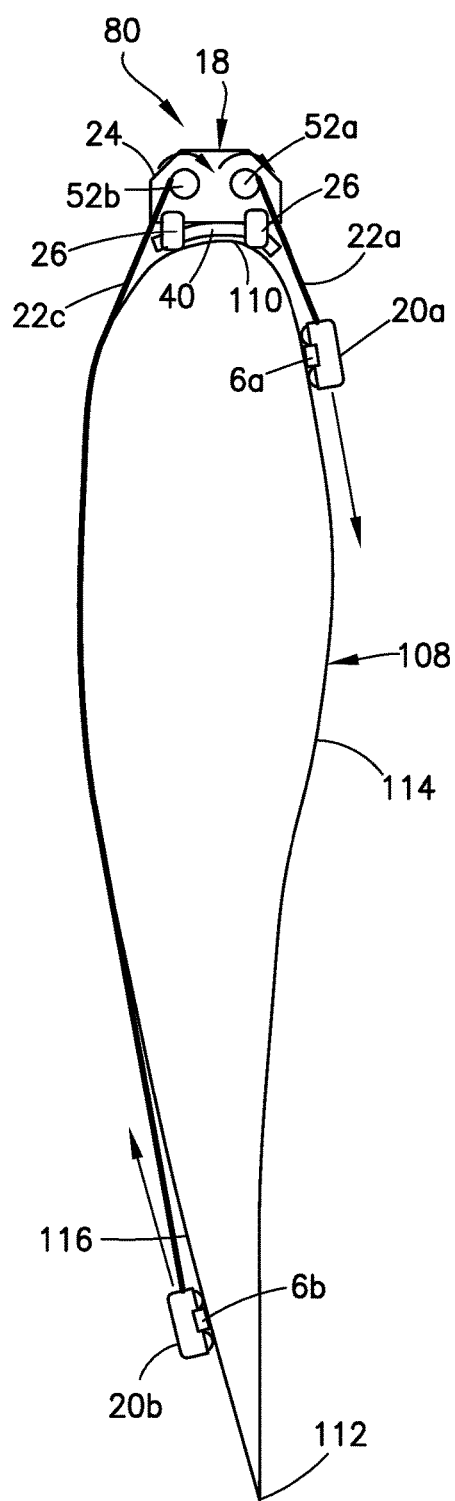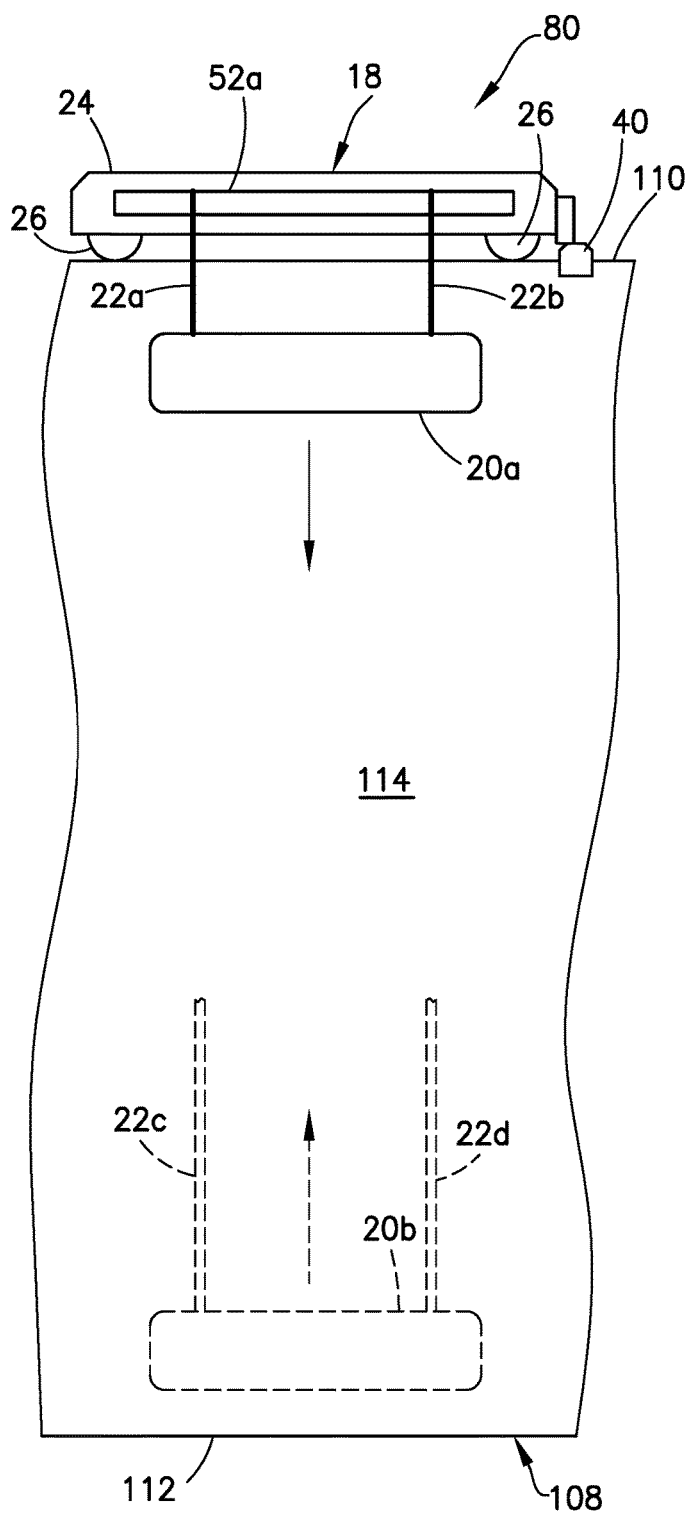
FIG.2
FIG.3

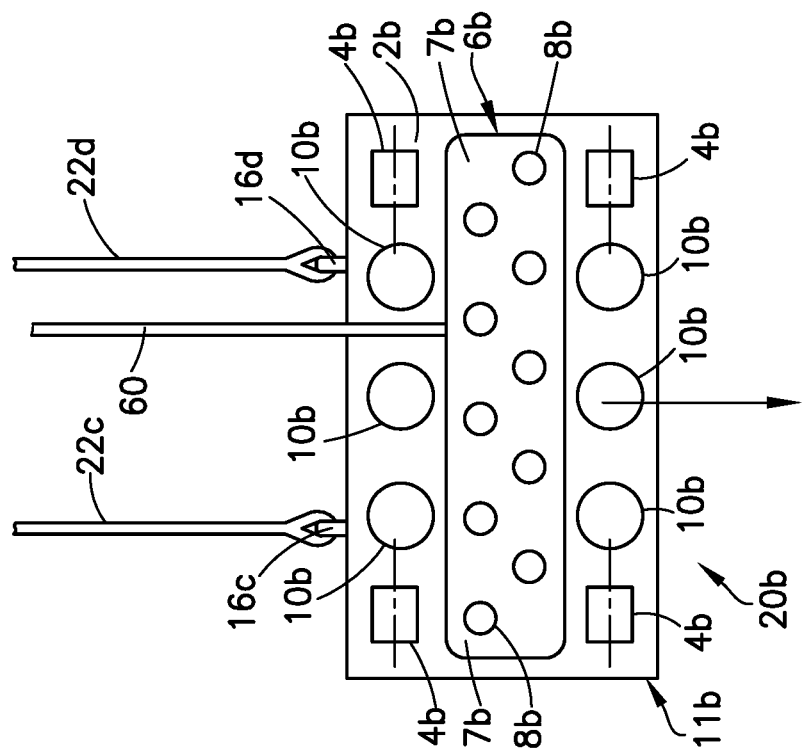
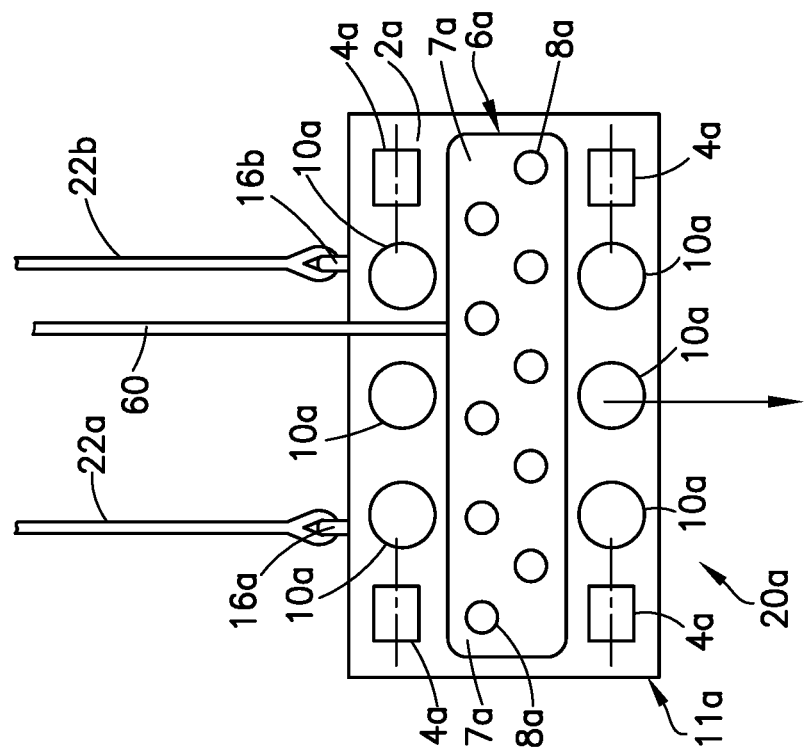

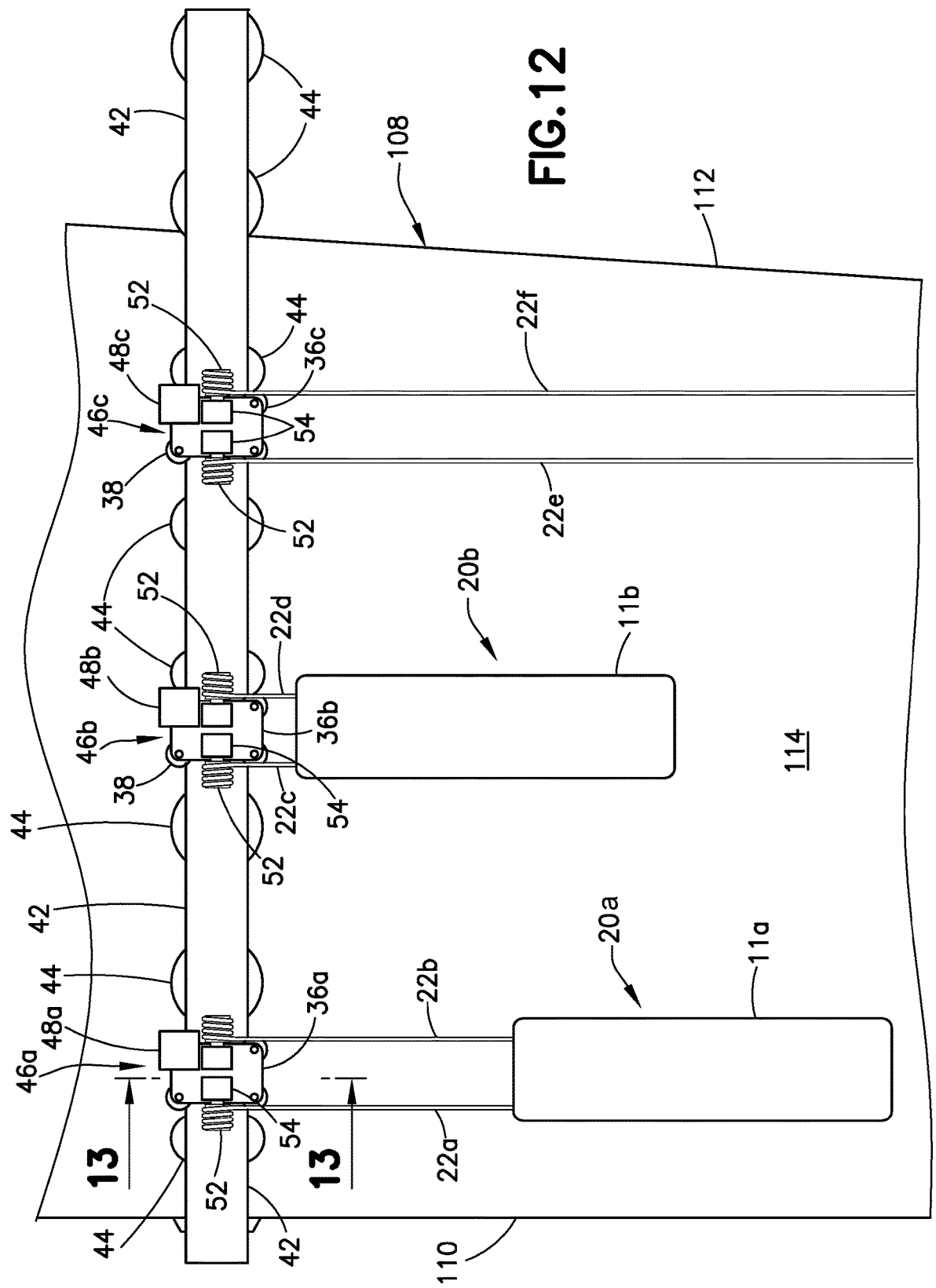

CABLE-SUSPENDED NON-DESTRUCTIVE INSPECTION UNITS FOR RAPID LARGE-AREA SCANNING

BACKGROUND

This disclosure generally relates to automated sensor systems used in non-destructive inspection (NDI). In particular, this disclosure relates to automated systems for enabling NDI scanning of the surfaces of large structures such as wind turbine blades.

A typical wind turbine has a multiplicity of blades extending radially outward from a central hub. Wind turbine blades are typically made of laminated fiber-reinforced plastic material and designed so that wind energy is converted into rotational motion efficiently. Blade efficiency is generally dependent upon blade shape and surface smoothness. However, during operation the wind turbine blades may be subjected to damage that has the potential to adversely affect structural integrity. Thus, it is common practice to visually inspect the exterior of each blade to identify potential structural anomalies.

It is known to manually inspect wind turbine blades by hoisting a person to a position adjacent to each blade via suspension from the tower, the hub, or a proximately located crane. However, manual blade inspection can be a time-consuming and difficult operation. To mitigate the drawbacks of manual inspection, various solutions involving an apparatus configured to travel in a spanwise direction along the length of a wind turbine blade have been proposed.

SUMMARY

The subject matter disclosed herein is directed to an automated apparatus and methods for large-area scanning of wind turbine blades or other large-bodied structures (such as aircraft fuselages and wings) for the purpose of non-destructive inspection. One or more vacuum-adhered scanning elements (hereinafter "scan heads") containing NDI sensors are lowered via cables and moved via a motorized cart or carriage driven along a region of the structure. Wind turbine blades can be rapidly inspected while oriented in a horizontal or vertical position using relative simple components and approaches.

Some of the technical features of the systems proposed herein include: (1) cables that lower and raise the scan heads using one or more motor-driven cable spools; (2) a cart driven along a leading edge of a horizontally disposed wind turbine blade or a carriage driven around a track attached to a vertically disposed wind turbine blade; (3) scan passes based upon sequenced horizontal and vertical motions of scan heads provided by cart/carriage and cable spool motion; (4) a conformable array of sensors attached to the cart that collect NDI data along the leading edge of a horizontally disposed wind turbine blade if the scan heads cannot reach that area.

In accordance with various embodiments disclosed herein, the automated apparatus comprises a wheeled vehicle having a multiplicity of sensor-carrying scan heads suspended therefrom by respective pairs of cables. In the case of a generally horizontally extending wind turbine blade, the wheeled vehicle may be in the form of a cart that travels along the leading edge of the wind turbine blade. In the case of a generally vertically extending wind turbine blade, the wheeled vehicle may be in the form of a carriage that rides on a flexible track disposed in a chordwise direction relative to the wind turbine blade. In either case, the scan heads hang on both sides of the wind turbine blade and are vacuum-adhered to respective side surfaces of the blade during scanning. The cable lengths may be adjusted to change the elevations of the scan heads to ensure full coverage of the wind turbine blade surfaces during scanning.

The vacuum adherence functionality referred to above is provided by one or more vacuum adherence devices that enable each scan head to adhere to but still move freely over the surface being inspected. Each vacuum adherence device is designed to float due to the presence of an air cushion between a seal and the surface when the vacuum adherence device is partially evacuated. This air cushion enables lateral displacement of the scan head relative to the surface because contact friction between the seal and the surface is avoided. The resulting total suction force is strong enough to adhere the scan head to the structure (e.g., an airfoil-shaped body), but not so strong as to inhibit lateral displacement. Thus, the term "adherence" as used herein means a floating adherence that allows the scan heads to move laterally over a non-level surface. In contrast, the term "attachment" as used herein excludes movement of the attached component relative to the structure to which it is attached.

Although various embodiments of apparatus and methods for large-area scanning of wind turbine blades or other large-bodied structures (such as aircraft fuselages and wings) for the purpose of non-destructive inspection are described in some detail later herein, one or more of those embodiments may be characterized by one or more of the following aspects.

One aspect of the subject matter disclosed in detail below is an automated apparatus for performing a non-destructive inspection of a body, comprising: a wheeled vehicle comprising a frame, a multiplicity of wheels rotatably coupled to the frame, and a drive motor operatively coupled for driving rotation of at least one wheel of the multiplicity of wheels; a spool rotatably coupled to the frame; a spool motor mounted to the frame and operatively coupled for driving rotation of the spool; a chassis comprising a base and at least one vacuum adherence device mounted to or incorporated in the base of the chassis; a first cable having one end attached to the spool and another end attached to the base of the chassis; a second cable having one end attached to the spool and another end attached to the base of the chassis; a sensor array attached to the base of the chassis; and a computer system configured to control operation of the drive motor, the spool motor and the sensor array to acquire sensor data over a scan area on a surface of a body.

In accordance with one embodiment of the automated apparatus described in the preceding paragraph, the sensor array comprises a conformable sensor support plank attached to a chassis and a multiplicity of sensors attached to the conformable sensor support plank. In accordance with various proposed implementations, the sensors are ultrasonic transducers or eddy current sensors. In accordance with another embodiment, the automated apparatus further comprises a track, in which case the wheeled vehicle is coupled to and movable along the track.

Optical imaging, infrared thermography, laser shearography, and digital radiography are some common inspection methods that could be applied using the apparatus disclosed herein. Such image-based sensing methods require some stand-off with the structure being inspected. For example, an imager or two-dimensional detector array may be supported by the chassis at a small distance away from the structure. The imaging area must be open to the imager (an open center of the substrate) or adjacent to the chassis. Optionally, the automated apparatus may further comprise a multiplicity of rolling elements rotatably coupled to the chassis (but not operatively coupled to any motors). In accordance with one embodiment, the multiplicity of rolling elements are configured to all contact the surface of the body concurrently, the at least one vacuum adherence device is configured to produce floating adherence to the surface of the body when the rolling elements of the chassis are in contact with the surface of the body, and the sensor array is directed toward the scan area on the surface of the body when the rolling elements of the chassis are in contact with the surface of the body.

Another aspect of the subject matter disclosed in detail below is an automated apparatus for performing a non-destructive inspection of a body, comprising: a wheeled vehicle comprising a frame, a multiplicity of wheels rotatably coupled to the frame, and a drive motor operatively coupled for driving rotation of at least one wheel of the multiplicity of wheels; first and second spools rotatably coupled to the frame; first and second pivot arms rotatably coupled to the frame for rotation about a first axis of rotation; first and second receiver collets fixedly coupled to or integrally formed with respective distal ends of the first and second pivot arms; a chassis comprising a base and at least one vacuum adherence device mounted to or incorporated in the base of the chassis; first and second rocker braces rotatably coupled to the base of the chassis for rotation about a second axis of rotation that is parallel to the first axis of rotation and configured to slidably fit inside the first and second receiver collets respectively; a first cable having one end attached to the first spool and another end attached to the first rocker brace; a second cable having one end attached to the second spool and another end attached to the second rocker brace; and a sensor array attached to the base of the chassis. The first and second cables respectively pass through the first and second receiver collets.

A further aspect of the subject matter disclosed in detail below is a method for performing a non-destructive inspection of an airfoil-shaped body, comprising: (a) orienting an airfoil-shaped body so that a leading edge of the airfoil-shaped is disposed generally vertical; (b) wrapping a flexible track around and attaching the flexible track to the airfoil-shaped body so that the flexible track lies in a generally horizontal plane; (c) coupling a first wheeled vehicle to the flexible track in a manner so that the first wheeled vehicle is movable along the flexible track; (d) suspending a first scan head from the first wheeled vehicle using first and second cables; (e) adhering the first scan head to a first non-horizontal surface of the airfoil-shaped body so that the first scan head is free to float across the first non-horizontal surface; (f) unwinding the first and second cables until the first scan head is suspended at a first elevation; (g) while the first scan head is suspended at the first elevation, moving the first wheeled vehicle generally horizontally along the flexible track from a first position adjacent a first area of the first non-horizontal surface of the airfoil-shaped body to a second position adjacent to a second area of the first non-horizontal surface of the airfoil-shaped body, the second area of the first non-horizontal surface being closer to the leading edge of the airfoil-shaped body than is the first portion of the first non-horizontal surface; and (h) using the first scan head to acquire sensor data from the first non-horizontal surface of the airfoil-shaped body as the first wheeled vehicle moves from the first position to the second position.

In accordance with one proposed implementation, the method described in the preceding paragraph further comprises: (i) while the first scan head is suspended at the first elevation, moving the first wheeled vehicle generally horizontally along the flexible track from the second position to a third position adjacent a first area of a second non-horizontal surface of the airfoil-shaped body; (j) using the first scan head to acquire sensor data from a third non-horizontal surface of the airfoil-shaped body which is intersected by the leading edge as the first wheeled vehicle moves from the second position to the third position; (k) while the first scan head is suspended at the first elevation, moving the first wheeled vehicle generally horizontally along the flexible track from the third position to a fourth position adjacent a second area of the second non-horizontal surface of the airfoil-shaped body, the first area of the second non-horizontal surface being closer to the leading edge than is the second area of the second non-horizontal surface; and (l) using the first scan head to acquire sensor data from the second non-horizontal surface of the airfoil-shaped body as the first wheeled vehicle moves from the third position to the fourth position.

In accordance with another proposed implementation, the method further comprises: (i) coupling a second wheeled vehicle to the flexible track in a manner so that the second wheeled vehicle is movable along the flexible track; (j) suspending a second scan head from the second wheeled vehicle using third and fourth cables; (k) adhering the second scan head to a second non-horizontal surface of the airfoil-shaped body so that the second scan head is free to float across the second non-horizontal surface; (l) unwinding the third and fourth cables until the second scan head is suspended at a second elevation; (m) while the second scan head is suspended at the second elevation, moving the second wheeled vehicle generally horizontally along the flexible track from a third position adjacent a first area of the second non-horizontal surface of the airfoil-shaped body to a fourth position adjacent to a second area of the second non-horizontal surface of the airfoil-shaped body, the first area of the second non-horizontal surface being closer to the leading edge of the airfoil-shaped body than is the second area of the second non-horizontal surface; and (n) using the second scan head to acquire sensor data from the second non-horizontal surface of the airfoil-shaped body as the second wheeled vehicle moves from the third position to the fourth position, wherein the first and second scan heads acquire sensor data concurrently while the first and second wheeled vehicles are moving concurrently along the flexible track.

Yet another aspect of the subject matter disclosed in detail below is a method for performing a non-destructive inspection of a body, comprising: (a) coupling a wheeled vehicle to a body in a manner so that the wheeled vehicle is movable relative to the body in a generally horizontal direction; (b) suspending a scan head from the wheeled vehicle using first and second cables; (c) adhering the scan head to a non-horizontal surface on one side of a body so that the scan head is free to float across the non-horizontal surface; (d) unwinding or winding the first and second cables to cause the scan head to displace vertically while the scan head is adhered to the non-horizontal surface; and (e) using the scan head to acquire NDI sensor data from the non-horizontal surface of the body as the scan head moves vertically. In accordance with some embodiments, step (a) comprises placing a wheeled vehicle on a leading edge of a wind turbine blade oriented while the leading edge is generally horizontal and with axes of rotation of the wheels of the wheeled vehicle being generally transverse to the leading edge.

In accordance with some embodiments, the method for performing a non-destructive inspection of a body comprises: winding first and second cables to cause a scan head to displace vertically upward to a first position near to and on one side of a leading edge of the body while the scan head remains adhered to a first non-horizontal surface of the body; rotating a pivot arm to cause the scan head to displace from the first position to a second position near to and on another side of the leading edge of the body while the scan head remains adhered to a surface of the leading edge; unwinding the first and second cables to cause the scan head to displace vertically downward to a third position near to and on another side of the leading edge of the body while the scan head remains adhered to a second non-horizontal surface on the other side of the body; and using the scan head to acquire NDI sensor data from the first and second non-horizontal surfaces of the body as the scan head moves vertically upward and then vertically downward.

Other aspects of apparatus and methods for large-area scanning of wind turbine blades or other large-bodied structures for the purpose of non-destructive inspection are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 2 is a diagram representing an end view of a wind turbine blade having an automated apparatus movably mounted on a generally horizontal leading edge and capable of scanning both sides of the blade using independently operable scan heads suspended by cables wound on respective cable spools in accordance with one embodiment.

FIG. 3 is a diagram representing a front view of the wind turbine blade with automated apparatus mounted thereon depicted in FIG. 2.

FIG. 7 is a diagram representing a front view of a scan head of a type that may be employed in the embodiments respectively depicted in FIGS. 2 and 5.

FIG. 12 is a diagram representing a front view of a portion of a generally vertically oriented wind turbine blade having multiple carriages movably mounted on a generally horizontal flexible track attached to the blade and having cable-suspended scan heads configured for scanning both sides of the vertically oriented blade in accordance with an alternative embodiment.

Reference will hereinafter be made to the drawings in which similar elements in different drawings bear the same reference numerals.

DETAILED DESCRIPTION

For the purpose of illustration, apparatus and methods for large-area scanning of wind turbine blades or other large-bodied structures for the purpose of non-destructive inspection will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A typical wind turbine has a multiplicity of blades extending radially outward from a central hub, to which the roots of the blades are attached. The hub is rotatably coupled to a nacelle that is supported at a height above ground by a tower. The blades are configured to generate aerodynamic forces that cause the wind turbine to rotate in response to wind impinging on the blade surfaces. The nacelle houses an electric generator which is operatively coupled to the hub. The electric generator is configured to generate electrical power as the hub rotates.

As used herein, the term "wind turbine blade" refers to an airfoil-shaped body having a leading edge and a trailing edge connected by upper and lower surfaces that extend from a root to a tip of the blade. The cross-sectional profile of the blade may change in size and shape from the root to the tip.

Figure 1:
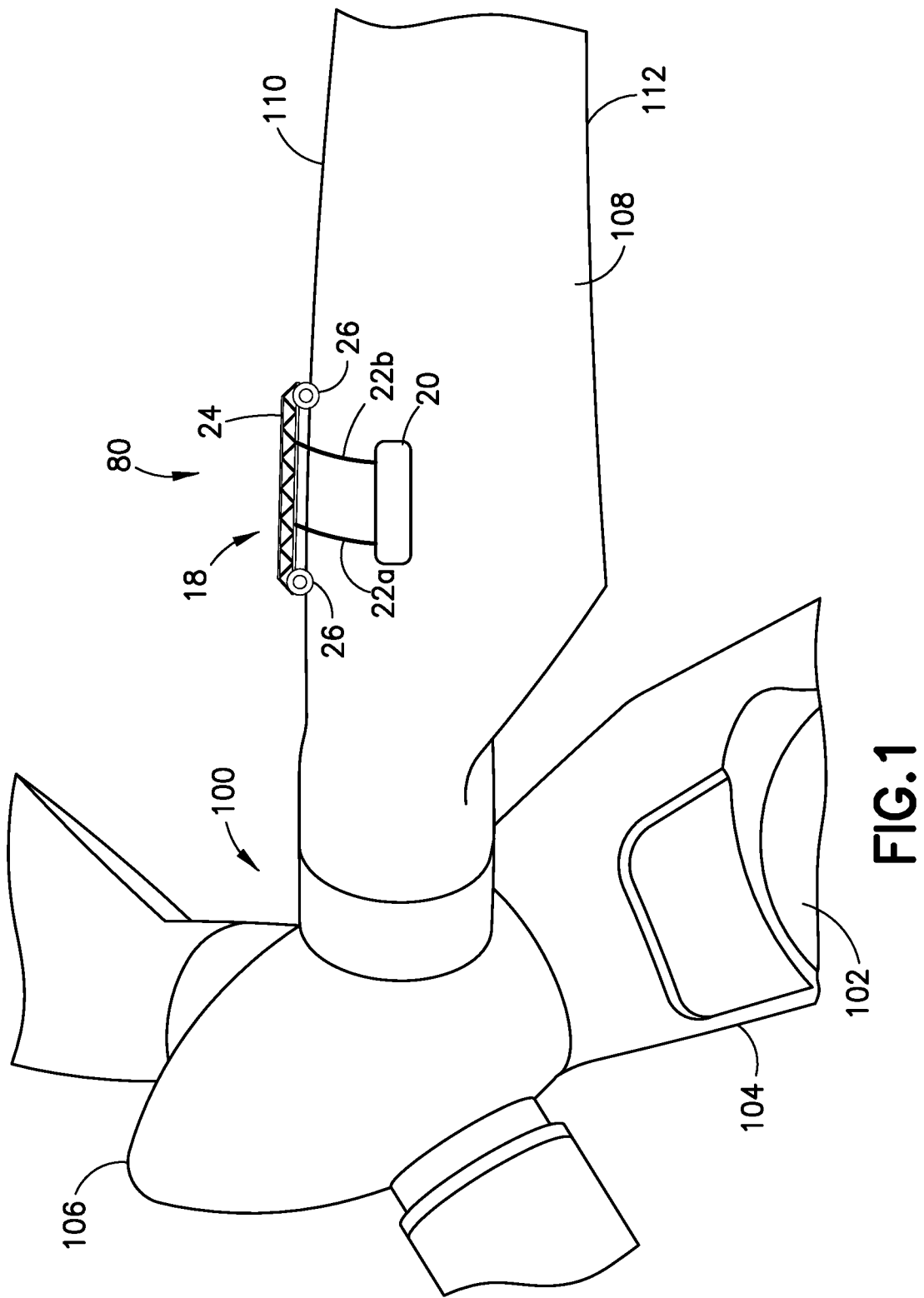
FIG. 1 is a diagram representing a view of a portion of a wind turbine having an automated apparatus mounted on a wind turbine blade for performing a non-destructive inspection. The angular position of the wind turbine blade is such that the leading edge extends generally horizontally.

FIG. 1 is a diagram representing a view of a portion of a wind turbine 100 having an automated apparatus 80 mounted on a wind turbine blade 108 for performing a non-destructive inspection in accordance with some embodiments. As partly illustrated in FIG. 1, the wind turbine 100 includes a tower 102, a nacelle 104 installed at a top end of the tower 102, a hub 106 that is rotatably mounted inside the nacelle 104, and a plurality of wind turbine blades 108 extending radially from the hub 106. Each wind turbine blade 108 includes a leading edge 110 and a trailing edge 112. The wind turbine blades 108 are caused to rotate by the forces exerted by wind, thereby rotating the hub 106 which is coupled to an electricity generator (not shown).

Cracks or scratches may occur in the wind turbine blades 108 during usage. Cracks may propagate if not attended to. Periodic inspections may be performed for detecting anomalies (e.g., cracks) in the wind turbine blades 108. The automated apparatus disclosed herein is designed to perform such non-destructive inspections.

In the scenario depicted in FIG. 1, the automated apparatus 80 is mounted on a wind turbine blade 108 having an angular position such that the leading edge 110 of the wind turbine blade 108 extends generally horizontally. Each wind turbine blade 108 of the wind turbine 100 may undergo non-destructive inspection in sequence by rotating the respective wind turbine blade into the angular position depicted in FIG. 1.

As seen in FIG. 1, the automated apparatus 80 in accordance with some embodiments includes a wheeled vehicle in the form of a cart 18 that is seated on and may travel along the leading edge 110 of the wind turbine blade 108. The automated apparatus 80 depicted in FIG. 1 is equipped with at least one scan head 20 suspended from a pair of cables 22a and 22b, which scan head 20 has sensors (not shown in FIG. 1) for non-destructively inspecting the surfaces of the wind turbine blade 108. In the embodiment depicted in FIG. 1, the scan head 20 has a length greater than a width, the lengthwise direction of the scan head 20 being generally parallel to the leading edge 110 when the wind turbine blade 108 is oriented generally horizontally.

FIG. 2 is a diagram representing an end (i.e. chordwise) view of the wind turbine blade 108 with an automated apparatus 80 placed thereon in the manner depicted in FIG. 1. FIG. 3 is a diagram representing a front view of the wind turbine blade 108 with the automated apparatus 80 mounted thereon as depicted in FIG. 2. As seen in FIG. 2, the wind turbine blade 108 includes two side surfaces 114 and 116 which intersect at the trailing edge 112 and are connected by the leading edge 110.

The automated apparatus 80 depicted in FIG. 2 includes a wheeled vehicle in the form of a cart 18 that is seated on and selectively travels along the leading edge 110 of the wind turbine blade 108. The cart 18 is equipped with a pair of cable spools 52a and 52b. The automated apparatus 80 further includes a first scan head 20a disposed on side surface 114 and a second scan head 20b disposed on side surface 116. In accordance with the particular embodiment depicted in FIGS. 2 and 3, the automated apparatus 80 further includes a first pair of cables 22a and 22b each having one end attached to the cable spool 52a, a first scan head 20a operatively coupled to the cable spool 52a by the first pair of cables 22a and 22b, a second pair of cables 22c and 22d each having one end attached to the cable spool 52b, and a second scan head 20b operatively coupled to the cable spool 52b by the second pair of cables 22c and 22d.

Still referring to FIGS. 2 and 3, the cart 18 includes a frame 24, a multiplicity of wheels 26 rotatably coupled to the frame 24, and a cart drive motor 62 (see FIG. 15) for driving rotation of at least one wheel of the multiplicity of wheels 26. The axes of rotation of the wheels 26 may be transverse to the leading edge 110 to facilitate cart travel along the leading edge 110. The wheels 26 of the cart 18 may be made of a material having a high frictional force, such as rubber, so that wheels 26 are disinclined to slide off of the surface of the leading edge 110.

Referring now to FIG. 2, each cable spool 52a and 52b is rotatably coupled to the frame 24 of the cart 18. In addition, a respective spool motor (not shown in FIG. 2, but see spool motor 54 in FIG. 15) is mounted to the frame 18 and operatively coupled for driving rotation of the cable spools 52a and 52b. The incorporation of two spool motors 54 allows the cable spools 52a and 52b to be rotated independently. In an alternative embodiment (e.g., an embodiment in which two scan heads 20a and 20b are positioned in a pitch-catch relationship on opposite sides for inspecting through the interior of the wind turbine blade 108), a gear system may be configured to enable one spool motor 54 to concurrently drive rotation of both cable spools 52a and 52b, thereby producing matched synchronized motion (both moving upward in tandem or both moving downward in tandem) of one scan head operating in a pitch mode and another scan head operating in a catch mode.

Scan head 20a carries a sensor array 6a designed to adhere in a floating manner to and acquire NDI sensor data from the side surface 114 of the wind turbine blade 108. Scan head 20b carries a sensor array 6b designed to adhere in a floating manner to and acquire NDI sensor data from the side surface 116 of the wind turbine blade 108.

Referring to FIG. 3, the scan head 20a vacuum adhered to side surface 114 of wind turbine blade 108 can be raised or lowered by rotation of the cable spool 52a. Similarly, the scan head 20b (indicated by dashed lines in FIG. 3) vacuum adhered to side surface 116 (not visible in FIG. 3, but see FIG. 2) of wind turbine blade 108 can be raised or lowered by rotation of the cable spool 52b. As scan head 20a and 20b move up and down, the sensor arrays 6a and 6b may be activated to acquire NDI sensor data from the respective areas being scanned.

During non-destructive inspection, scan head 20a is scanned vertically (i.e., in a chordwise direction relative to the wind turbine blade 108, hereinafter referred to as the Y-axis) across the side surface 114 of the wind turbine blade 108 at successive longitudinal positions (i.e., spaced along an X-axis). For example, in accordance with one possible scanning mode, scan head 20a is first displaced vertically downward while the cart 18 is stationary with the sensor array 6a acquiring NDI inspection data during the downward movement. Proximity sensors (not shown in FIG. 3) on the scan head 20a will indicate when the scan head 20a is in proximity to the trailing edge 112 of the wind turbine blade 108 and a controller will stop rotation of the cable spool 52a in response to signals from the proximity sensors indicating that the trailing edge 112 has been reached. The downward displacement of the scan head 20a is stopped before the scan head 20a goes beyond the trailing edge 112 of the wind turbine blade 108. While scan head 20a remains at the elevation where its downward displacement was stopped, the cart 18 is displaced horizontally along the leading edge 110 by a distance approximately equal to the width of the sensor array 6a and then stopped. Next, while the cart 18 is again stationary, the scan head 20a is displaced vertically upward with the sensor array 6a acquiring NDI inspection data during the upward movement. Proximity sensors (not shown in FIG. 3, but see FIG. 18) on the cart 18 will indicate when the scan head 20a is in proximity to the leading edge 110 of the wind turbine blade 108 and the controller will stop rotation of the cable spool 52a in response to signals from the proximity sensors indicating that the scan head 20a is near the cart frame 24 (and thus near the leading edge 110). The upward displacement of the scan head 20a is stopped before the scan head 20a reaches the leading edge 110 of the wind turbine blade 108. This process may be repeated to scan side surface 114 along the entire length of the wind turbine blade 108. The scan head 20b may be operated in a similar manner to scan the side surface 116.

More specifically, in the embodiment depicted in FIGS. 2 and 3, the sensor arrays 6a and 6b carried by scan heads 20a and 20b each include a multiplicity of sensors (e.g., ultrasonic transducers or eddy current sensors) lined up in an array and attached to a conformable substrate called a "conformable sensor support plank" (not shown in FIGS. 2 and 3, but see conformable sensor support planks 7a and 7b in FIGS. 7A and 7B) to provide a wide scan. During each vertical scan, the sensor arrays 6a and 6b each acquire a respective swath of NDI sensor data (e.g., ultrasound or eddy current scan data). After each vertical scan, the scan heads 20a and 20b are moved to the next longitudinal position by activating the cart drive motor 62 to cause the cart 18 to displace along the leading edge 110 of the wind turbine blade 108 by a distance approximately equal to the width of the scan swath (e.g., the length of the sensor array). Successive swaths of NDI sensor data may be acquired from successive contiguous vertical segments of the wind turbine blade 108 to provide full scan coverage from the root to the tip of the wind turbine blade 108. For example, a multiplicity of subsets of NDI sensor data may be acquired from a corresponding multiplicity of continuous column-shaped vertical scan areas, which subsets of NDI sensor data may then be stitched together to create a set of NDI sensor data representing the structural health of a side of the wind turbine blade 108.

In cases where the automated apparatus relies on separate sets of scan heads disposed on opposite sides of the wind turbine blade 108 which are unable to scan the leading edge 110 due to the presence of the cart 18, those sets of scan heads may be used to acquire NDI sensor data from opposite sides of the wind turbine blade 108 but not in the area of the leading edge 110. In such situations, an additional leading edge scan head 40 (described in more detail below with reference to FIG. 15) may be mounted at one end of the cart frame 24, which leading edge scan head 40 is configured to acquire NDI sensor data from the blade surface as the cart travels along the leading edge 110.

Although FIGS. 2 and 3 depict only a single scan head suspended on each side of the wind turbine blade 108, the automated apparatus 80 depicted in FIGS. 2 and 3 may be equipped with a first multiplicity of cable-suspended scan heads on one side of the wind turbine blade 108 and a second multiplicity of cable-suspended scan heads on the other side of the wind turbine blade 108. More specifically, one subset of scan heads may be suspended in positions whereat non-destructive inspections may be performed on side surface 114 of the wind turbine blade 108; another subset of scan heads may be suspended in positions whereat non-destructive inspections may be performed on side surface 116 of the wind turbine blade 108.

In accordance with one proposed implementation, multiple scan heads 20 are suspended on both sides of the wind turbine blade 108. In this case the scan heads on one side of the wind turbine blade 108 may be spaced apart by distances approximately equal to the width of a sensor array. In accordance with one possible scanning mode, while the cart 18 is stationary at a first spanwise position, all of the scan heads on one side of the wind turbine blade are displaced vertically downward along mutually parallel paths. Following completion of these downward scans, the cart 18 is moved a distance approximately equal to the width of a sensor array to a second spanwise position along the leading edge 110 of the wind turbine blade 108. While the cart 18 is stationary at the second first spanwise position, all of the scan heads on the one side of the wind turbine blade are displaced vertically upward along mutually parallel paths. Thus the scan heads on one side of the wind turbine blade 108 may acquire respective sets of NDI sensor data from respective stripe-shaped areas on the surface of wind turbine blade 108 during the downward scans, which interrogated areas may be separated by areas which are interrogated during the upward scans. The interleaved NDI sensor data acquired during these scans is then stitched together for the purpose of displaying an image of the entire scanned area.

Figure 4:
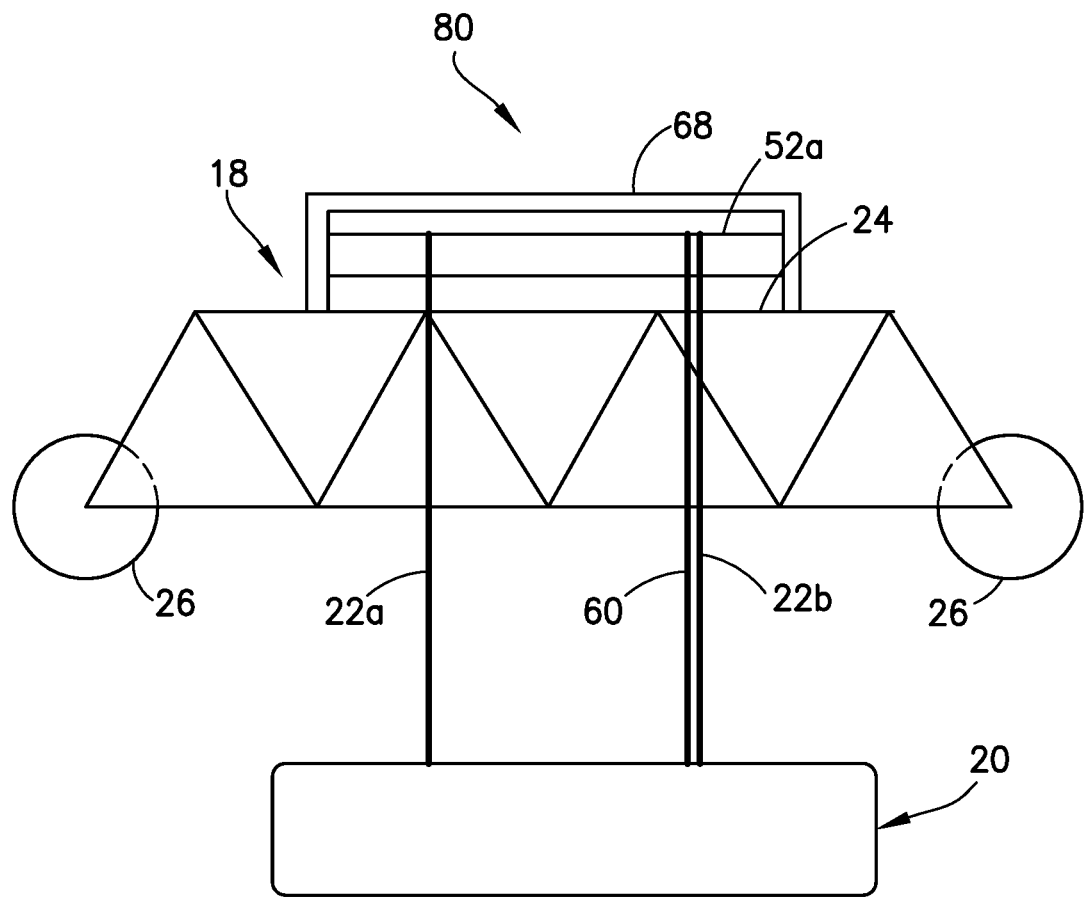
FIG. 4 is a diagram representing a side view of an automated apparatus comprising an NDI scan head suspended by cables from a wheeled vehicle designed to roll on a leading edge of the wind turbine blade.

FIG. 4 is a diagram representing a side view of an automated apparatus 80 comprising a scan head 20 suspended by two cables 22a and 22b from the cart 18. The uppermost portion of each of the cables 22a and 22b is wound around the cable spool 52a. The opposing ends of the cable spool 52a are respectively rotatably coupled to opposite sides of a spool support 68. The spool support 68 is affixed to (e.g., by fastening or welding) or integrally formed with the cart frame 24. In alternative embodiments, each of the cables 22a and 22b may be attached to separate cable spools supported by respective spool supports. The distal ends of the cables 22a and 22b are respectively attached to one side of the scan head 20 at respective attachment points (e.g., hooks). Thus the orientation of the scan head 20 can be controlled by adjusting the respective lengths of the paid-out portions of cables 22a and 22b. In accordance with the inspection procedures disclosed herein, the scan head 20 is selectively displaceable upward or downward depending on the direction in which the cable spool 52a is rotated. When the cable spool 52a is rotated in one direction, the cables 22a and 22b are wound on the cable spool 52, causing the scan head 20 to displace upward; when the cable spool 52a is rotated in the opposite direction, the cables 22a and 22b are unwound from the cable spool 52a, causing the scan head 20 to displace downward.

As previously noted, the scan head 20 depicted in FIG. 4 includes a sensor array (not visible in FIG. 4, but see sensor arrays 6a and 6b in FIG. 1). Typically the sensor array is powered electrically and controlled electronically. FIG. 4 depicts a scan head 20 that receives electrical power via a power/signal cord 60 that extends from the cart 18 to the scan head 20. The power/signal cord 60 also provides control signals from a controller (e.g., a computer system) which controls the operation of the sensor array carried by the scan head 20. The power/signal cord 60 may also provide a pathway for sending NDI sensor data acquired by the sensor array to a transceiver onboard the cart 18, which transceiver relays the NDI sensor data to a ground station (e.g., control computer 90 in FIG. 17).

The power/signal cord 60 is depicted in FIG. 4 as being separate from the cables 22. One portion of power/signal cord 60 is wrapped around the cable spool 52a, while the distal end of power/signal cord 60 is attached to the scan head 20. Thus during rotation of the cable spool 52a, the cables 22a and 22b and the power/signal cord 60 will wind or unwind in unison so that equal lengths of cord and cable will be either taken up or paid out concurrently. This feature enables the scan head 20 to receive electrical power and control signals without interruption during vertical displacement. In alternative implementation, the power/signal cord may be incorporated in one of the cables 22a and 22b.

In accordance with an alternative embodiment, the scan head 20 may communicate wirelessly with a ground-based control station while receiving electrical power from batteries mounted on the cart 18. This would avoid the use of multiple power/signal cords running from multiple scan heads to the ground-based control station via the cart 18. The wireless communications would include: (a) the sending of control signals from a transceiver at the ground-based control station to transceivers on the cart 18 and on the scan heads 20a and 20b, which control signals are then forwarded to the motor controllers onboard cart 18 and to the sensor arrays 6a and 6b onboard scan heads 20a and 20b; and (b) the sending of data acquired by the sensor array 6a and 6b onboard scan heads 20a and 20b from the transceivers onboard the scan heads 20a and 20b to the transceiver at the ground-based control station.

Figure 5:
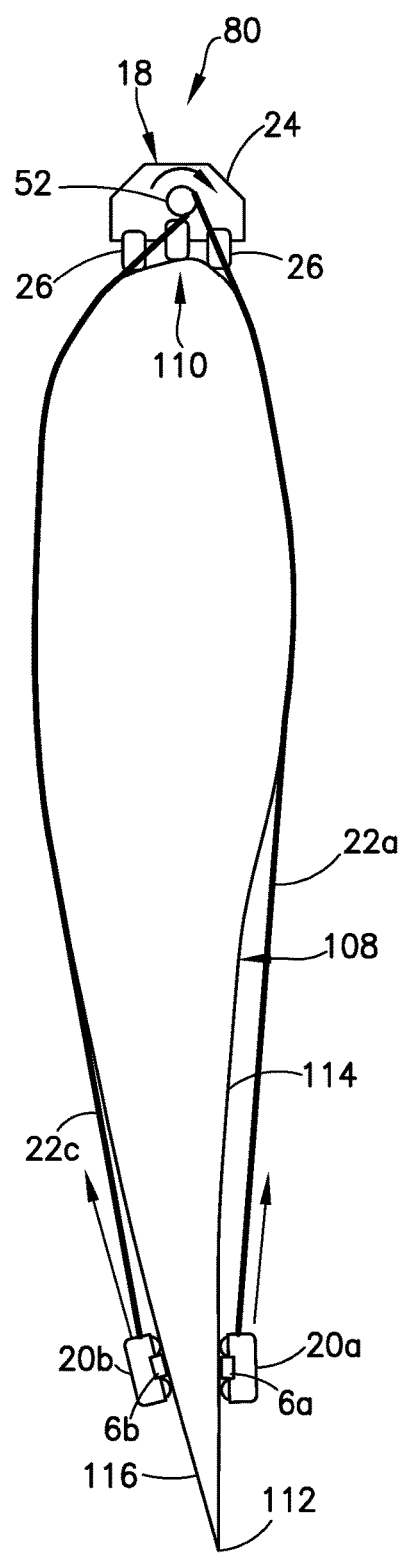
FIG. 5 is a diagram representing an end view of a wind turbine blade having an automated apparatus movably mounted on a generally horizontal leading edge and capable of scanning both sides of the blade using synchronized scan heads suspended by cables wound on the same cable spool in accordance with another embodiment.
Figure 6:
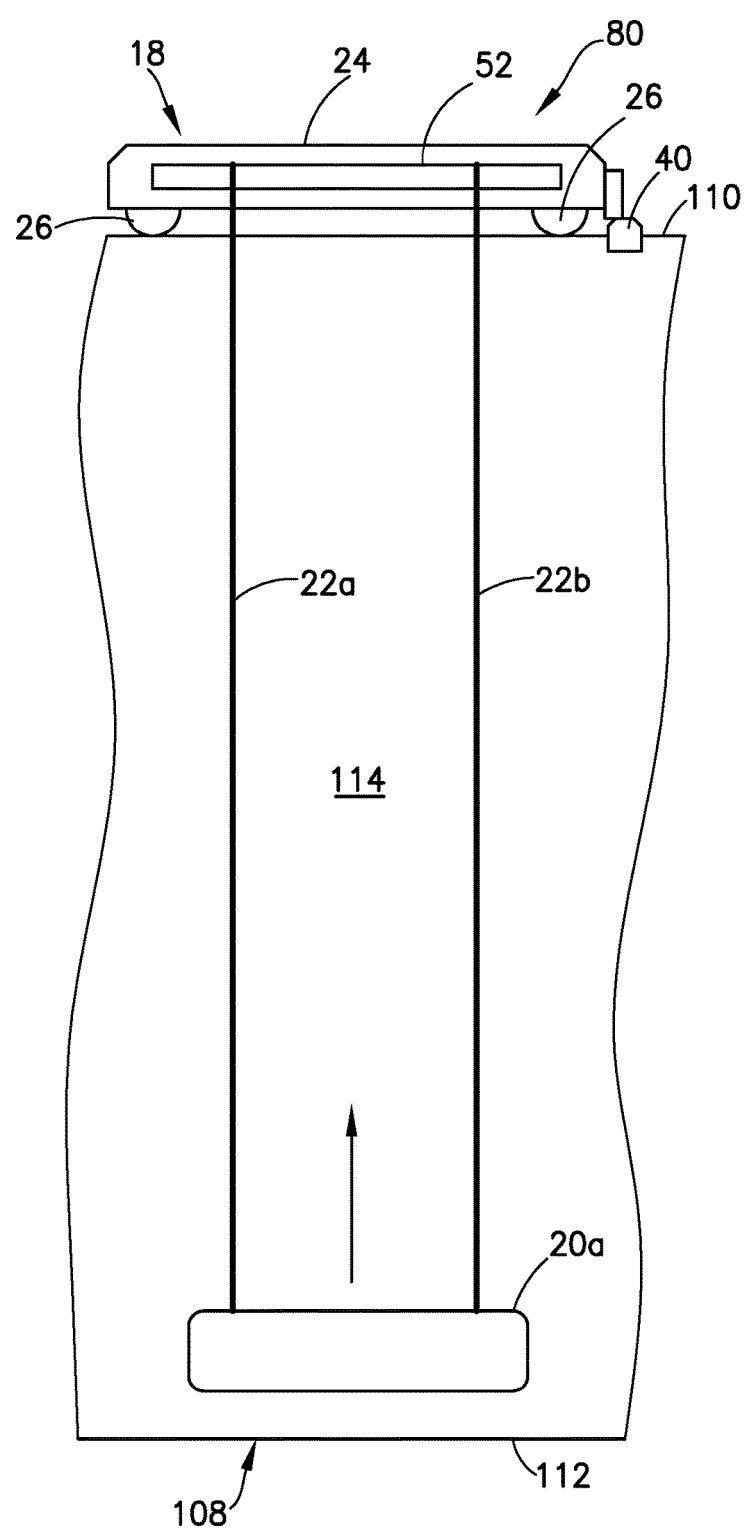
FIG. 6 is a diagram representing a front view of the wind turbine blade with automated apparatus mounted thereon depicted in FIG. 5.

FIG. 5 is a diagram representing an end (i.e. chordwise) view of the wind turbine blade 108 with an automated apparatus 80 for non-destructive inspection in accordance with an alternative embodiment. FIG. 6 is a diagram representing a front view of the wind turbine blade 108 with the automated apparatus 80 mounted thereon as depicted in FIG. 5. The primary difference between the embodiments respectively depicted in FIGS. 2 and 5 is that the cart 18 depicted in FIG. 5 has only one cable spool 52, whereas the cart 18 depicted in FIG. 2 has two cable spools 52a and 52b. With respect to the embodiment depicted in FIGS. 5 and 6, scan heads 20a and 20b are respectively suspended from cables 22a and 22b which are attached to cable spool 52. In accordance with the proposed implementation depicted in FIG. 5, cables 22a and 22b are wound on the cable spool 52 in the same direction, in which case when the cable spool 52 is rotated in one direction, scan heads 20a and 20b will move upward in unison, whereas when the cable spool 52 is rotated in the opposite direction, scan heads 20a and 20b will move downward in unison. Two scan heads that move on opposite sides of the same portion of a wind turbine blade 108 in a synchronized manner may be configured to operate in respective pitch and catch modes to enable non-destructive (e.g., ultrasonic) inspection of the interior of the wind turbine blade 108.

FIGS. 7A and 7B are diagrams representing front views of respective scan heads 20a and 20b of a type that may be employed in the embodiments depicted in FIGS. 2 and 5. The scan head 20a depicted in FIG. 7A includes a chassis 11a that carries a sensor array 6a. The chassis 11a includes a base 2a, a plurality of vacuum adherence devices 10a mounted to or incorporated in the base 2a, and a plurality of rolling elements 4a rollably coupled to the base 2a. The scan head 20a depicted in FIG. 7A is suspended by a pair of cables 22a and 22b which, as previously described, have one end attached to a cable spool 52 (not shown in FIG. 7, but see FIG. 5) and another end attached to the base 2a of chassis 11a by means of respective hooks 16a and 16b.

Similarly, the scan head 20b depicted in FIG. 7B includes a chassis 11b that carries a sensor array 6b. The chassis 11b includes a base 2b, a plurality of vacuum adherence devices 10b mounted to or incorporated in the base 2b, and a plurality of rolling elements 4b rollably coupled to the base 2b. The scan head 20b depicted in FIG. 7B is suspended by a pair of cables 22c and 22d which, as previously described, have one end attached to a cable spool 52 and another end attached to the base 2b of chassis 11b by means of respective hooks 16c and 16d.

The scan head 20a depicted in FIG. 7A will now be further described (the elements of scan head 20b depicted in FIG. 7B have similar functionality). In accordance with one proposed implementation, the rolling elements 4a of scan head 20a are wheels rotatably mounted to the base 2a, the axes of rotation of the wheels being transverse to the cables 22a and 22b to facilitate rolling of the scan head 20a during vertical displacement. In accordance with an alternative proposed implementation, the rolling elements 4a are ball-and-socket bearings, such as the ball-and-socket bearings 78 depicted in FIG. 15. In cases wherein ball-and-socket bearings are employed, the scan head 20a is capable of omnidirectional movement.

The sensor array 6a of the scan head 20a depicted in FIG. 7A includes a conformable sensor support plank 7a and a multiplicity of sensors 8a attached to the conformable sensor support plank 7a. The conformable sensor support plank 7a is preferably a flexible substrate made, for example, of semi-rigid rubber optionally reinforced with carbon or nylon rods. In accordance with one embodiment, the sensors 8a are ultrasonic transducers. In accordance with another embodiment, the sensors 8a are eddy current sensors. As the scan head 20a is displaced vertically, the sensors 8a may be repeatedly activated to acquire NDI sensor data from the confronting surfaces of the body being inspected.

Although FIG. 7A shows one configuration in which the sensor array 6a is flanked by respective rows of vacuum adherence devices 10a and in which four rolling elements 4a are disposed at the four corners of a generally rectangular base 2a, the rolling elements 4a and vacuum adherence devices 10a may be arranged in other configurations. For example, the positions of the rolling element 4a in each corner and the nearest vacuum adherence device 10a may be reversed so that the sequence of elements flanking the sensor array 6 is 10a-4a-10a-4a-10a instead of 4a-10a-10a-10a-4a. Other arrangements are possible. For example, for some applications the scan head 20a may be configured to not include rolling elements 4a.

If the sensors 8a are ultrasonic transducer arrays, the power/signal cord 60 shown in FIG. 4 provides control signals from a controller (e.g., a computer system) which controls the activation of the ultrasonic transducers to transmit ultrasound waves into the surface being interrogated. The scan head 20a depicted in FIG. 7A may be further configured to receive water via a hose for acoustically coupling the ultrasonic transducers to the surface being interrogated. The power/signal cord 60 may also provide a pathway for sending ultrasonic inspection data acquired by the ultrasonic transducers to a transceiver onboard the cart 18, which transceiver relays the ultrasonic inspection data to a ground station (e.g., control computer 90 in FIG. 17).

Still referring to FIG. 7A, the vacuum adherence devices 10*a* are configured to provide "floating" adherence of the chassis 11*a* to the convex curved contours of the external side surfaces 114 and 116 of the wind turbine blade 108. In accordance with one proposed implementation, the vacuum adherence devices 10*a* are floating (i.e., frictionless) suction cups 150 of a type depicted in FIGS. 16A and 16B. All of the floating suction cups 150 attached to the base 2*a* of chassis 11*a* may have a similar if not identical structure.

Figure 16A:
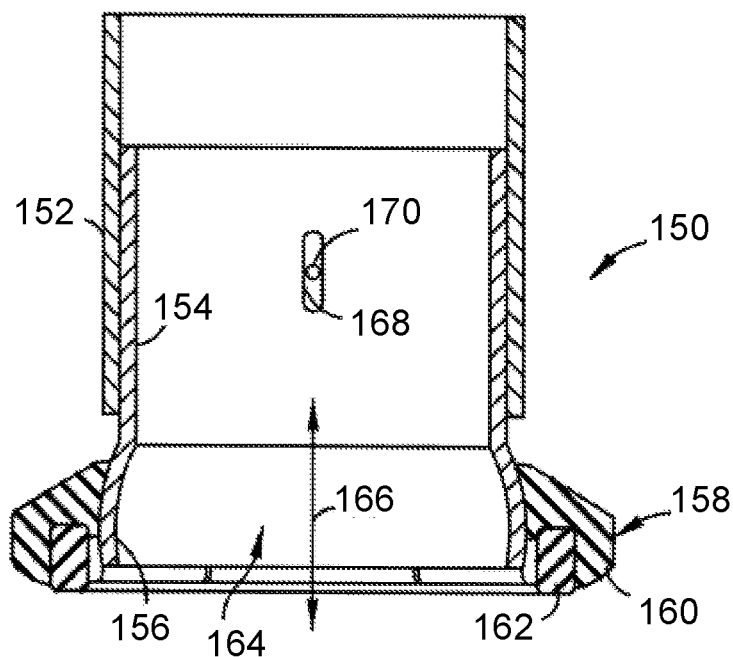
FIG. 16A is a diagram representing a cross-sectional view of a vacuum adherence device in accordance with one implementation.

FIG. 16A is a diagram showing a cross-sectional view of a floating suction cup 150 in accordance with one proposed implementation. This floating suction cup 150 comprises a circular cylindrical sleeve housing 152 and a sleeve 154 having a circular cylindrical portion which is axially slidable along a center axis 166 inside the sleeve housing 152. The sleeve 154 further comprises bearing portion 156 having an outer spherical bearing surface having a center point located along the center axis 166. The bearing portion 156 may be integrally formed with the aforementioned circular cylindrical portion of sleeve 154. The floating suction cup 150 further comprises a pivotable seal assembly 158 comprising a socket ring 160 that holds a seal 162. The socket ring 160 also has an inner spherical bearing surface which is concentric with and pivotably coupled to the outer spherical bearing surface of bearing portion 156 of sleeve 154. The pivot point of the socket ring 160 is collocated with the center point of the outer spherical bearing surface of bearing portion 156 of sleeve 154.

The pivotable seal assembly 158 is configured to rotate relative to the sleeve 154 about the pivot point to at least partially conform to a shape of a confronting surface. The floating suction cup 150 can adhere to such a confronting surface when air is drawn into a channel 164 formed in part by the channel of sleeve housing 152, in part by the channel of sleeve 154, and in part by the opening in the seal 162. The pivotable seal assembly 158 is configured to rotate relative to the sleeve 154 independently of translational movement of the sleeve 154 in a direction parallel to the center axis 166 within the sleeve housing 152. The amount of rotation of pivotable seal assembly 158 may be limited by the size and/or shape of the outer spherical bearing surface of the bearing portion 156 of sleeve 154.

Although not shown in FIG. 16A, the floating suction cup 150 preferably comprises a spring arranged to urge the sleeve 154 to extend out of the sleeve housing 152 by downward (as seen in the view of FIG. 16A) sliding along the center axis 166. This sliding movement may be restricted to within a selected range of movement. However, sleeve 154 may "float" freely relative to sleeve housing 152 within this selected range of movement. This restriction of the translational motion of sleeve 154 can be implemented by providing a slot 168 in the wall of the circular cylindrical portion of sleeve 154 and by providing a pin 170 which extends radially inward from the wall of sleeve housing 152 and into the slot 168. The pin 170 may also be used to hold sleeve 154 inside sleeve housing 152. The length of slot 168 restricts the sliding movement of sleeve 154 relative to sleeve housing 152.

The channel 164 is in fluid communication with a control valve (not shown in FIG. 16A), which control valve is in turn in flow communication with a vacuum pump (also not shown in FIG. 16A) disposed either on the cart 18 or on the ground. In either case a hose connects the vacuum system onboard scan head 20 with the vacuum pump. The vacuum pump, control valve, channel 164, and connecting conduits form a vacuum system which is configured to draw air into the channel 164 such that a vacuum adherence is formed between the pivotable seal assembly 158 and a confronting surface. The vacuum adherence is the result of a vacuum pressure generated inside the channel 164. When the flow of air is reversed, air sucked by the vacuum pump flows through any gap between the seal 162 and the confronting external surface of the wind turbine blade 108. The flow of air radially inward through such gap has the effect of producing an air cushion. The height of the gap may vary along the periphery of the seal 162. This gap height depends on the shape of the confronting surface and the degree of rotation of the seal 162 to conform to that shape.

The seal 162 may be formed of any one of a number of different materials. For example, seal 162 may comprise silicone rubber or other elastomeric material, a viscoelastomeric material, or some other suitable flexible material.

Figure 16B:
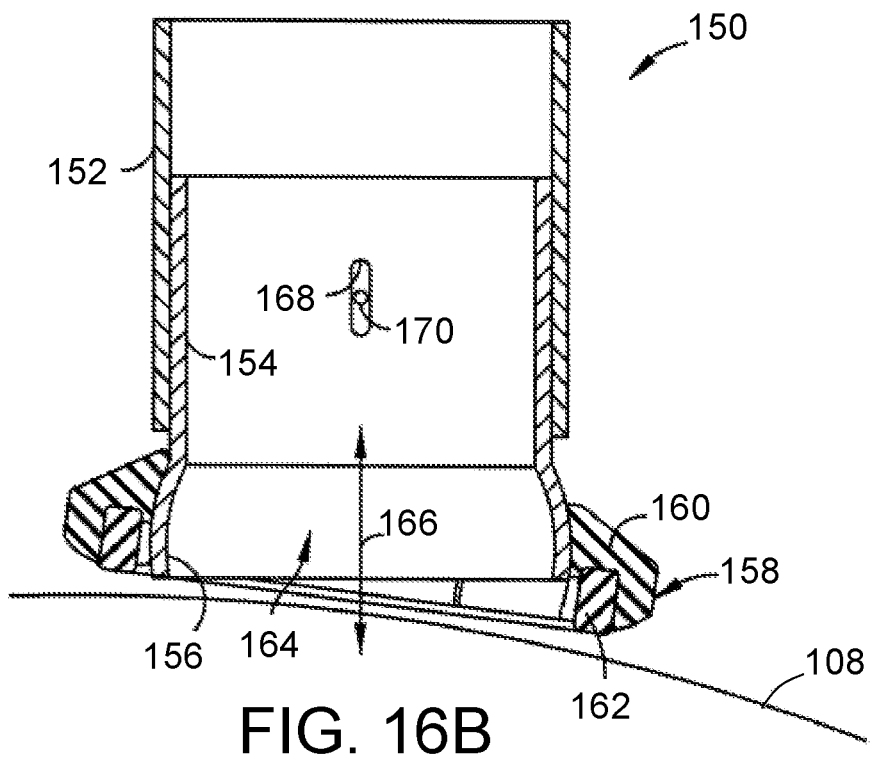
FIG. 16B is a diagram representing a cross-sectional view of the vacuum adherence device depicted in FIG. 16A adhered to a non-planar blade surface. The air gap between the vacuum adherence device and the non-planar surface has been exaggerated for the purpose of illustration.

FIG. 16B shows a cross-sectional view of the floating suction cup 150 depicted in FIG. 16A adhered to a convex curved external surface of a wind turbine blade 108. The air gap between the floating suction cup 150 and the external surface has been exaggerated for the purpose of illustration. The air gap may function as an air bearing that holds the pivotable seal assembly 158 close to the external surface of the wind turbine blade 108, while reducing static friction to within selected tolerances. In other words, the air gap allows pivotable seal assembly 158 to "float" above the external surface while maintaining vacuum adherence between pivotable seal assembly 158 and the external surface. Further, the air gap allows pivotable seal assembly 158 to be moved over the external surface of the wind turbine blade 108 with a reduced amount of static friction and without causing undesired effects to the surface.

In one embodiment, the seal 162 may be corrugated in such a way as to allow small channels for airflow between the seal 162 and the external surface 84. In some instances, these corrugated channels have been shown to promote vacuum on surfaces of uneven profile or varying surface roughness. In accordance with this embodiment, the corrugations may comprise a low-friction material that further induces sliding such that base motion will be enabled, yet airflow is ensured by the corrugated channels.

The above-described vacuum adherence devices 10*a* and 10*b* enable the scan heads 20*a* and 20*b* to respectively vacuum adhere to side surfaces 114 and 116 of the wind turbine blades 108. Non-destructive inspections may be performed while the scan heads 20*a* and 20*b* are vacuum adhered to side surfaces 114 and 116. During such non-destructive inspections, the scan heads 20*a* and 20*b* are displaced vertically while the cart 18 is stationary.

One method for performing a non-destructive inspection of a body using the automated apparatus depicted in either FIG. 2 or FIG. 5 may be characterized by the following steps: (a) couple a wheeled vehicle (such as cart 18) to a body (such as wind turbine blade 108) in a manner so that the wheeled vehicle is movable relative to the body in a generally horizontal direction; (b) suspend a first scan head 20*a* from the wheeled vehicle using first and second cables 22*a* and 22*b*; (c) adhere the first scan head 20*a* to a first non-horizontal surface on one side of the body so that the first scan head 20*a* is free to float across the first non-horizontal surface; (d) unwind or wind the first and second cables 22*a* and 22*b* to cause the first scan head 20*a* to displace vertically while the first scan head 20*a* is adhered to the first non-horizontal surface; (e) use the first scan head 20*a* to acquire first sensor data from the first non-horizontal surface of the body as the first scan head 20*a* moves vertically; (f) suspend a second scan head 20*b* from the wheeled vehicle using third and fourth cables 22*c* and 22*d*; (g) adhere the second scan head 20*b* to a second non-horizontal surface of the body so that the second scan head 20*b* is free to float across the second non-horizontal surface while adhered to the second non-horizontal surface; (h) unwind or wind the third and fourth cables to cause the second scan head 20*b* to displace vertically; and (i) use the second scan head 20*b* to acquire second NDI sensor data from the second non-horizontal surface of the body as the second scan head 20*b* moves vertically. Steps (e) and (i) may be performed concurrently. In accordance with some embodiments, step (a) includes placing a wheeled vehicle on a generally horizontal surface of the body (e.g., a leading edge 110 of a wind turbine blade 108) that connects the first and second non-horizontal surfaces of the body (e.g., side surfaces 114 and 116 of the wind turbine blade 108), which wheeled vehicle moves periodically by a distance approximately equal to a width of a scan head after each vertical scan.

Figure 15:
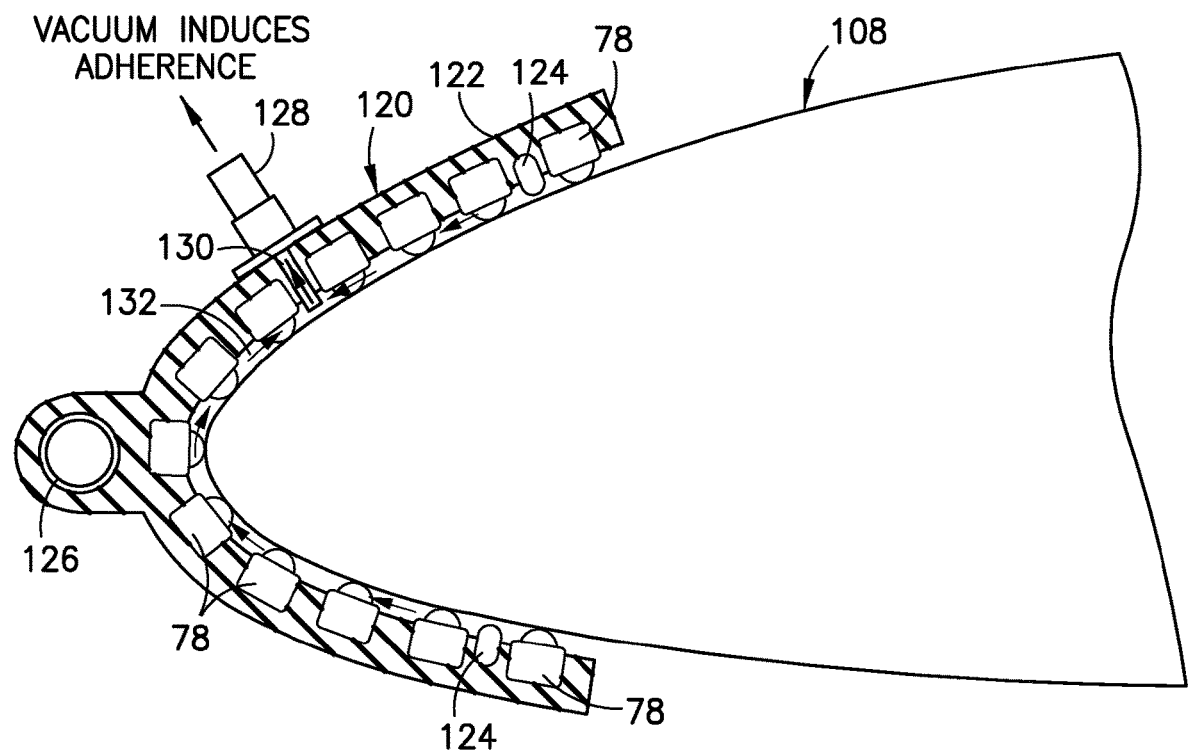
FIG. 15 is a diagram showing a sectional view of a flexible scan head (the sensors are not shown to avoid clutter) designed to conform to the leading edge of a blade component in accordance with one embodiment.

As previously mentioned, an additional leading edge scan head 40 (see FIGS. 2, 3 and 6 may be mounted at one end of the cart frame 24, which leading edge scan head 40 is configured to acquire NDI sensor data from the a surface area intersected by the leading edge 110 as the cart travels along the leading edge 110. FIG. 15 is a diagram showing a sectional view of a flexible leading edge scan head 40 that includes a multiplicity of sensors (the sensors are not shown to avoid clutter) affixed to a conformable vacuum plate 40, which conformable vacuum plate 40 is designed to conform to the leading edge 110 of the wind turbine blade 108. The leading edge scan head 40 includes a flexible vacuum plate 120 designed to float on a concave curved surface when the flexible vacuum plate 120 is partially evacuated. The sensors may be arranged in multiple rows flanked by two rows of ball-and-socket bearings 78. The ball-and-socket bearings 78 seen in FIG. 15 are capable of omnidirectional movement over the surfaces of a wind turbine blade 108 while maintaining the alignment of scan head 40 with the leading edge 110.

The structure of the flexible vacuum plate in accordance with one proposed implementation is shown in FIG. 15, which is a sectional view taken in a plane normal to the axis of the wind turbine blade 108. The flexible vacuum plate 120 is an assembly comprising a flexible substrate 122 (made, e.g., of semi-rigid rubber optionally reinforced with carbon or nylon rods), a flexible vacuum seal 124 (made, e.g., of rubber) attached to the flexible substrate 122 along a perimeter, and a multiplicity of the ball-and-socket bearings 78, the sockets of which are embedded in the flexible substrate 122. When in a flattened state, the shape of the flexible substrate 122 is rectangular, while the ball-and-socket bearings 78 are arranged in two rows with a sensor array (not shown in FIG. 15) disposed therebetween. Only one row of ball-and-socket bearings 78 is visible in FIG. 15.

The flexible substrate 122 and opposing surfaces of the wind turbine blade 108 form a chamber 132 which is sealed along a perimeter by the vacuum seal 124. This vacuum seal 124 is designed so that when the balls of the ball-and-socket bearings 78 are in contact with a surface of the wind turbine blade 108, there will be a slight gap between the vacuum seal 124 and the confronting surface that allows some air to flow into chamber 132 when the chamber 132 is partially evacuated.

The flexible substrate 122 can be formed by molding. The molded structure shown in FIG. 15 includes a protuberance that has an attachment bushing 126 embedded therein for coupling the flexible vacuum plate 120 to either end of the frame 24 of the cart 18. The flexible substrate 122 further includes an opening that has a channel 130 embedded therein. The channel 130 connects to a vacuum port 128, which is in turn connected to a vacuum pump (not shown in FIG. 15). The distal end of the channel 130 is in flow communication with the chamber 132. When the vacuum pump is activated, the resulting partial vacuum formed in chamber 132 will produce a suction force that adheres the flexible vacuum plate 120 to the leading edge 110 of the wind turbine blade 108, but still allows the flexible vacuum plate 120 to float due to the air cushion created by air being sucked through the slight gap between vacuum seal 124 and confronting surface in the area of the leading edge 110. The flow of air inside chamber 132, through channel 130 and out vacuum port 128 during evacuation is indicated by arrows in FIG. 15.

In accordance with an alternative embodiment, NDI coverage of the surface area intersected by the leading edge 110 of the wind turbine blade 108 may be provided by designing an automated apparatus 80 that is configured to enable each scan head to circumnavigate the profile of the wind turbine blade starting from a position adjacent to the trailing edge 112 on the side surface 114 and ending at a position adjacent to the trailing edge 112 on the side surface 116, including smoothly crossing over the leading edge 110. During transit of a vacuum-adhered scan head 20 vertically upward on side surface 114, transversely across the leading edge 110, and vertically downward on side surface 116, a sensor array 6 is repeatedly activated to acquire NDI sensor data, including from the surface area intersected by the leading edge 110. Accordingly, a separate leading edge scan head may be omitted.

Figure 8:
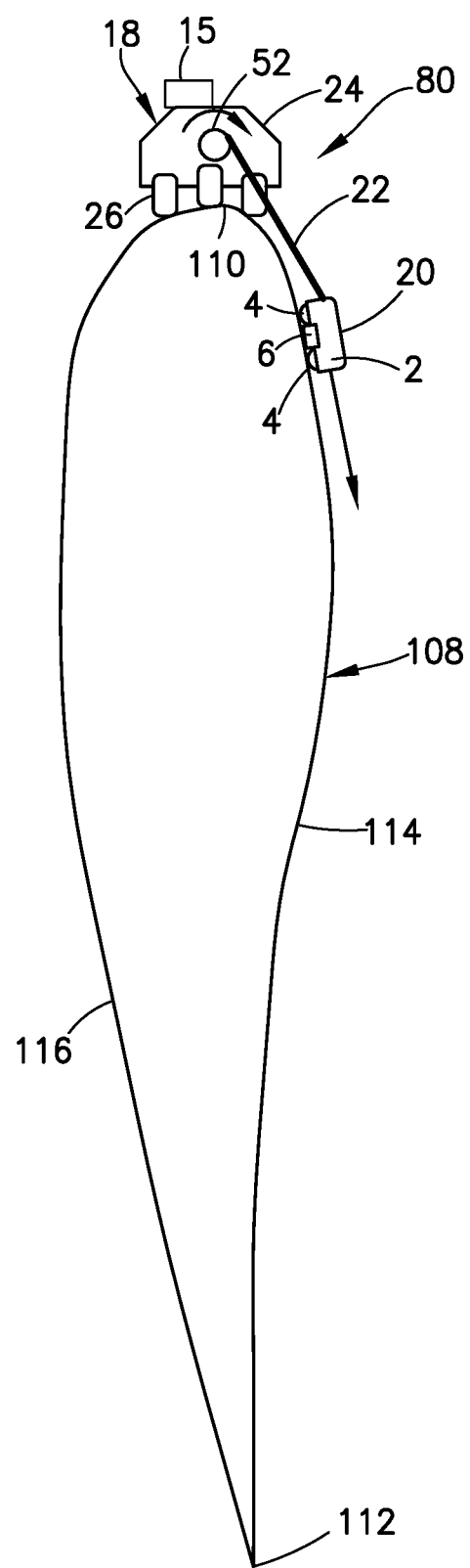
FIG. 8 is a diagram representing an end view of a wind turbine blade having an automated apparatus movably mounted on a generally horizontal leading edge and capable of scanning both sides of the vertical blade using a single scan head in accordance with a further embodiment.

FIG. 8 is a diagram representing an end view of a wind turbine blade 108 having an automated apparatus 80 movably mounted on a generally horizontal leading edge 110 and capable of scanning both sides of the vertical blade using one scan head 20 that includes a sensor array 6. First, the vacuum-adhered scan head 20 is moved vertically upward on side surface 114 of the wind turbine blade 108 from near the trailing edge 112 to near the leading edge 110. The scan head 20 at the top then moves transversely over and across the leading edge 110 by a predetermined distance. Thereafter the scan head 20 is displaced vertically downward on side surface 116 of the wind turbine blade 108, moving from near the leading edge 110 to near the trailing edge 112. When the scan head 20 is at the top of the wind turbine blade 108, the cable spool 52 is stopped. After the scan head 20 has moved across the leading edge 110 with the assistance of a pivot arm (not shown in FIG. 8, but see pivot arms 14*a* and 14*b* in FIG. 9), the cable spool 52 then begins to rotate in the opposite direction.

Each pair of pivot arms 14*a* and 14*b* associated with a respective scan head 20 is activated to rotate in response to receipt of a feedback signal from a proximity sensor (not shown in FIG. 8) when the sensor array 6 is near the top of its run. The pivot arms 14*a* and 14*b* may be like a wiper blade that pushes the scan head 20 across the leading edge 110 of the wind turbine blade 108 so that the sensor array 6 can travel down and scan the side surface 116 of the wind turbine blade 108 as the cable spool 52 rotates to unwind the cables 22*a* and 22*b*, thereby lowering the vacuum-adhered scan head 20. Once a full swath of data has been acquired at a first longitudinal position of the cart 18, the cart 18 moves forward the width of the sensor array 6 (or single sensor) and the process is repeated back the other way.

Optionally, the cart 18 may further include an adjustable ballast in the form of a counterweight 15 (shown in FIG. 8) that is transversely slidable back and forth across the cart frame 24 to keep the cart 18 from being pulled off balance when the scan head 20 is on one side of the wind turbine blade 108. The counterweight 15 is moved by a motor-driven, non-backdrivable lead screw 59 (see FIG. 18), which holds the counterweight 15 in place even when power is disrupted. Control of counterweight position is provided either by direct operator commands or by a computer programmed in accordance with an automatic balancing algorithm. The automated position control is based on sensor feedback indicating an imbalanced cart 18. For example, a cart imbalance sensor may take the form of strain gauges which measure the tension in cables 22*a* and 22*b*, which tension produces a force tending to urge the cart 18 to tip over. To counteract any imbalance, the computer onboard the cart 18 may adjust the position of the counterweight 58 relative to the cart frame 24 to exert a force nearly equal to and opposite to the unbalancing force. In accordance with one proposed implementation, the counterweight 15 is carried by a counterweight carriage (not shown) which is coupled to the lead screw 59. The counterweight carriage moves across the cart frame 24 when the lead screw 59 is driven to rotate by a counterweight motor 58 (see FIG. 18). Rotation of the lead screw 59 may be driven by the counterweight motor 58 via a belt (not shown) which circulates on respective pulleys. The counterweight carriage travels moves across the cart frame 24 by means of a linear guide unit (not shown in the drawings) comprising a linear guide track attached to the cart frame and a slider (not shown in the drawings) attached to the counterweight carriage and operatively coupled to the lead screw by means of a nut (not shown in the drawings), which threadably engages the lead screw. The slider further includes a pair of recirculating ball bearings, the balls of which roll along the linear guide track. Optionally, the position of the counterweight carriage can be measured by a position sensor (e.g., an encoder) to provide feedback to a computer 72 (see FIG. 18) programmed with counterweight motion control software for controlling the counterweight motor 58 as a function of the moment produced by unbalanced hanging scan heads.

In accordance with an alternative embodiment, an even number of scan heads 20 may be suspended from the cart 18 and the computer 72 is programmed to control the positions of the scan heads 20 so that the scan heads 20 are always in a balanced state, e.g., equal numbers of scans heads are suspended on opposite side of the wind turbine blade. In this configuration, the adjustable ballast feature may be omitted from the cart 18.

Figure 9:
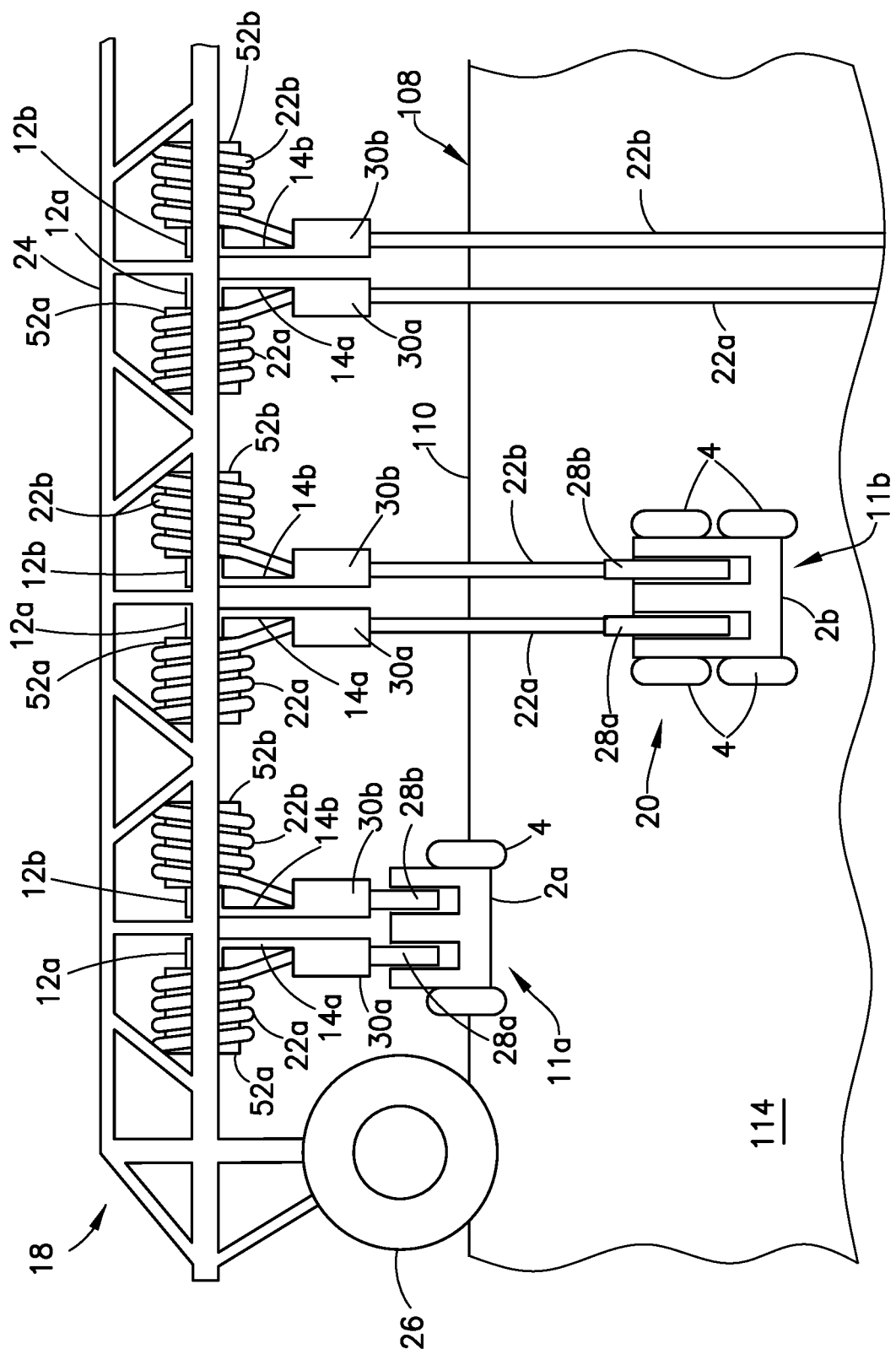
FIG. 9 is a diagram representing a front view of a portion of an automated apparatus having multiple scan heads, each scan head being capable of scanning both sides of the blade and a leading edge area therebetween during continuous travel along a scan path that nearly circumnavigates the profile of the wind turbine blade (except for the trailing edge).

FIG. 9 is a diagram representing a front view of a portion of an automated apparatus 80 having multiple scan heads (only two scan heads 20*a* and 20*b* are visible in FIG. 9), each of the scan heads 20*a* and 20*b* being capable of scanning both sides of the wind turbine blade 108 and a top surface area intersected by the leading edge 110 during continuous travel along a scan path that circumnavigates the profile of the wind turbine blade 108 (except for the trailing edge 112).

As depicted in FIG. 9, each of the scan heads 20*a* and 22*b* includes a base 2*a* and a plurality of rolling elements 4 (e.g., wheels, as depicted in FIG. 9) rollably coupled to the base 2*a*. Each of the scan heads 20*a* and 20*b* is suspended by a respective pair of cables 22*a* and 22*b*. Cable 22*a* has one end attached to a cable spool 52*a* and another end attached to the base 2*a*, while cable 22*b* has one end attached to a cable spool 52*b* and another end attached to the base 2*a*. The cart 18 is equipped with a respective pair of cable spools 52*a* and 52*b* for each of the scan heads 20*a* and 20*b*. The cable spools 52*a* and 52*b* are coaxial. In accordance with alternative embodiments, the rolling elements are ball-and-socket bearings.

In the embodiment depicted in FIG. 9, the cables of each pair of cables 22*a* and 22*b* are partially wound on a respective pair of cable spools 52*a* and 52*b*. The cart frame 24 depicted in FIG. 9 is further equipped with a respective pair of pivot spindles 12*a* and 12*b* for each scan head. The pivot spindles 12*a* and 12*b* are respectively connected to or integrally formed with a respective pair of pivot arms 14*a* and 14*b* for each scan head. In addition, a respective pair of receiving collets 30*a* and 30*b* are respectively connected to or integrally formed with the respective pair of pivot arms 14*a* and 14*b* for each scan head. In addition, each of the scan heads 20*a* and 20*b* further includes a respective pair of rocker braces 28*a* and 28*b*. One pair of rocker braces 28*a* and 28*b* is rotatably coupled to base 2*a* of scan head 20*a*; another pair of rocker braces 28*a* and 28*b* is rotatably coupled to base 2*b* of scan head 20*b*; and so forth.

As best seen in FIG. 9, the cart frame 24 is configured as a gantry that is supported at opposing ends by respective sets of wheels 26. The ends of the gantry are connected to an elevated central portion overlying the leading edge 110 of the wind turbine blade 108 that provides clearance for the passage underneath of scan heads 20*a* and 20*b* as the scan moves from one side of the wind turbine blade 108 to the other side.

Figure 10:
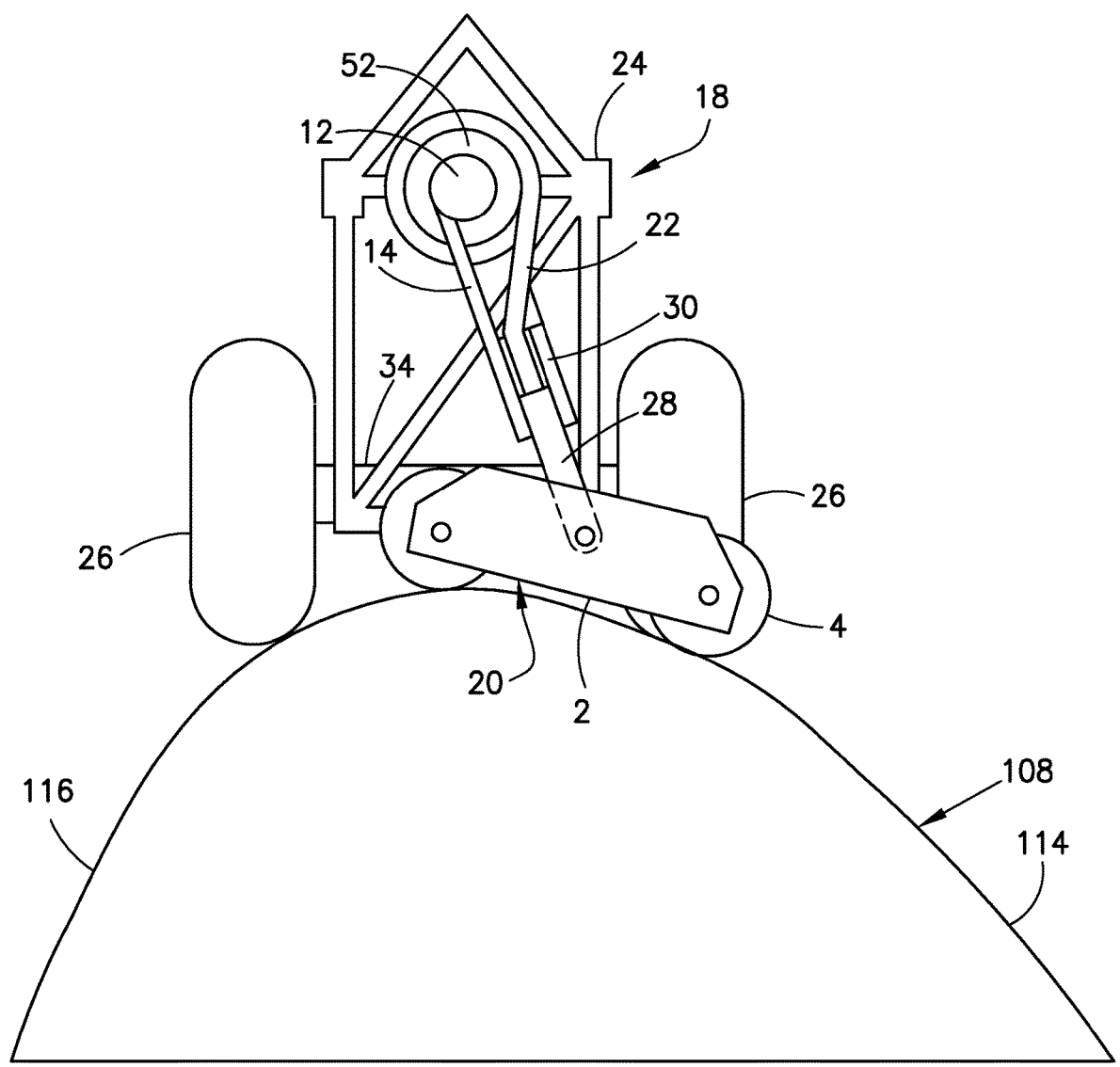
FIG. 10 is a diagram representing a sectional view of the automated apparatus depicted in FIG. 9 and showing one scan head in the vicinity of the leading edge of the wind turbine blade. The section is taken along plane 10-10 indicated in FIG. 9.

FIG. 10 is a diagram representing a view of a portion of the automated apparatus 80 depicted in FIG. 9. Only one scan head 20 is shown in FIG. 10. Each of the scan heads 20*a* and 20*b* shown in FIG. 9 may have the structure depicted in more detail in FIG. 10.

FIG. 10 shows one scan head 20 underneath a portion of the cart frame 24 and in the vicinity of the leading edge 110 of the wind turbine blade 108. A portion of the cable 22 is wound on the cable spool 52. The distal end of the cable 22 is attached to the end of the rocker brace 28, which is shown in FIG. 10 in a state wherein a portion of the rocker brace 28 has been slidably inserted into the associated receiving collet 30. At least a portion of the cable 22 passes through the receiving collet 30.

As will be explained in more detail below with reference to FIGS. 11A through 11G, when the scan head 20 is in the position depicted in FIG. 10, with the rocker brace 28 partially inserted in and in engagement with the receiving collet 30, each pivot arm 14 is driven to rotate by a pivot arm motor (not shown in FIG. 10, but see pivot arm motor 56 in FIG. 18). The pair of rotating pivot arms 14 exert respective forces that cause the scan head 20 to roll from one side of a leading edge area of the top surface of the wind turbine blade 108 to the other side of the leading edge area, During the passage of the scan head 20 over the top surface of the wind turbine blade 108, the sensor array 6 (not shown in FIG. 10) may be activated to acquire NDI sensor data.

FIGS. 11A through 11G are diagrams representing respective end views of the automated apparatus 80 depicted in FIGS. 9 and 10 when one scan head 20 (vacuum-adhered to the side surface 114 of a wind turbine blade 108) is in seven different positions during continuous travel along the aforementioned scan path that nearly circumnavigates the profile of the wind turbine blade 108. During transit of the vacuum-adhered scan head 20 from one side of the trailing edge 112 to the other side of trailing edge 112, the sensor array 6 is repeatedly activated to acquire additional NDI sensor data (including while the scan head 20 is positioned at the respect positions depicted in FIGS. 11A-11G).

Figure 11A:
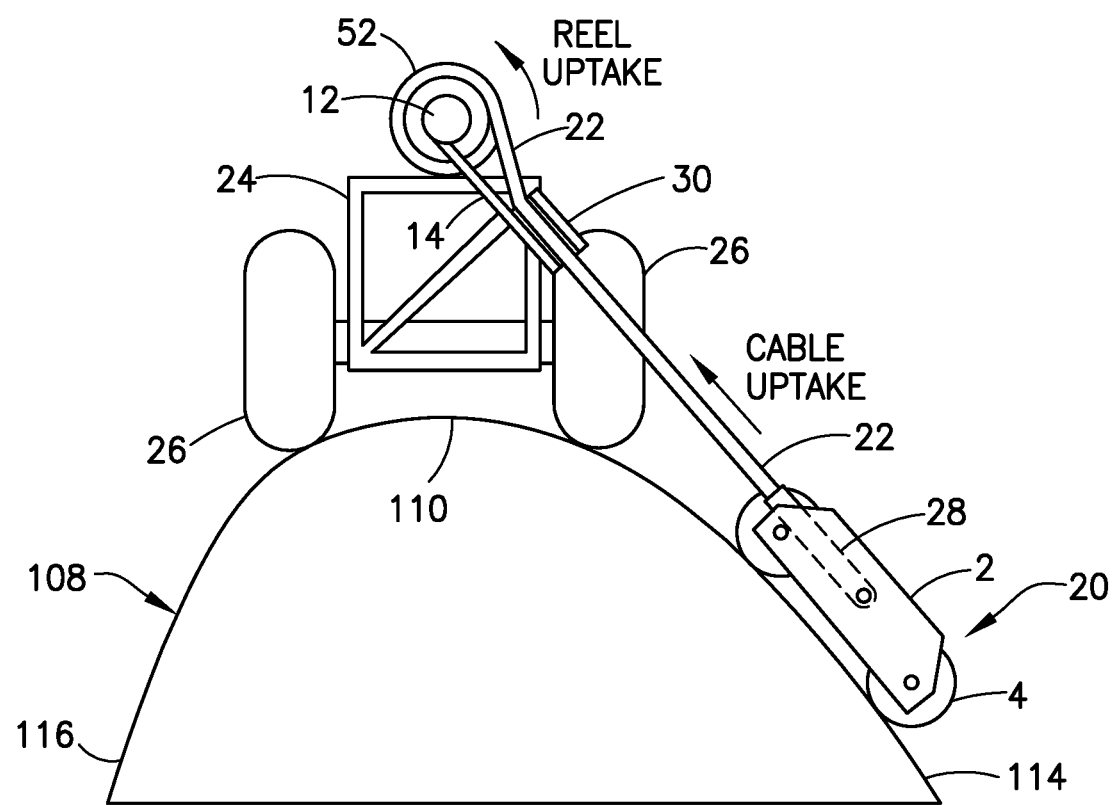
FIGS. 11A through 11G are diagrams representing respective end views of the automated apparatus depicted in FIG. 9 when one scan head is in seven different positions during continuous travel along the aforementioned scan path that nearly circumnavigates the profile of the wind turbine blade.

FIG. 11A depicts the automated apparatus 80 (operating in a cable uptake mode) at a first instant in time when the rolling elements 4 of a scan head 20 suspended from a pair of cables 22 are in contact with side surface 114 on one side of the leading edge 110 of a wind turbine blade 108 and the cables 22 are being wound on the rotating cable spools 52 (winding rotation of the cable spool 52 is indicated in FIG. 11A by the curved arrow labeled "REEL UPTAKE"). More specifically, a computer (not shown in FIGS. 11A-11G, but see computer 72 in FIG. 18) onboard the cart 18 sends commands to various motor controllers 70 (see FIG. 18), which in turn control the spool motors 54 to operate in a coordinated manner to ensure that the vacuum-adhered scan head 20 moves vertically upward over the side surface 114 of the wind turbine blade 108.

Each cable 22 has a distal end attached to an associated rocker brace 28, a portion which is wound on an associated cable spool 52, and a portion that passes through an associated receiver collet 30. The winding of a further portion of each cable 22 causes the distal portions of the cables 22 to displace toward the cable spools 52 (displacement of the distal portions of the cables 22 is indicated in FIG. 11A by the straight arrow labeled "CABLE UPTAKE"). The uptake of cables 22 in turn causes the scan head 20 to move upward toward the leading edge. During this upward movement of the scan head 20, the sensor array 6 (not shown in FIG. 11A) is repeatedly activated to acquire NDI sensor data.

Figure 11B:
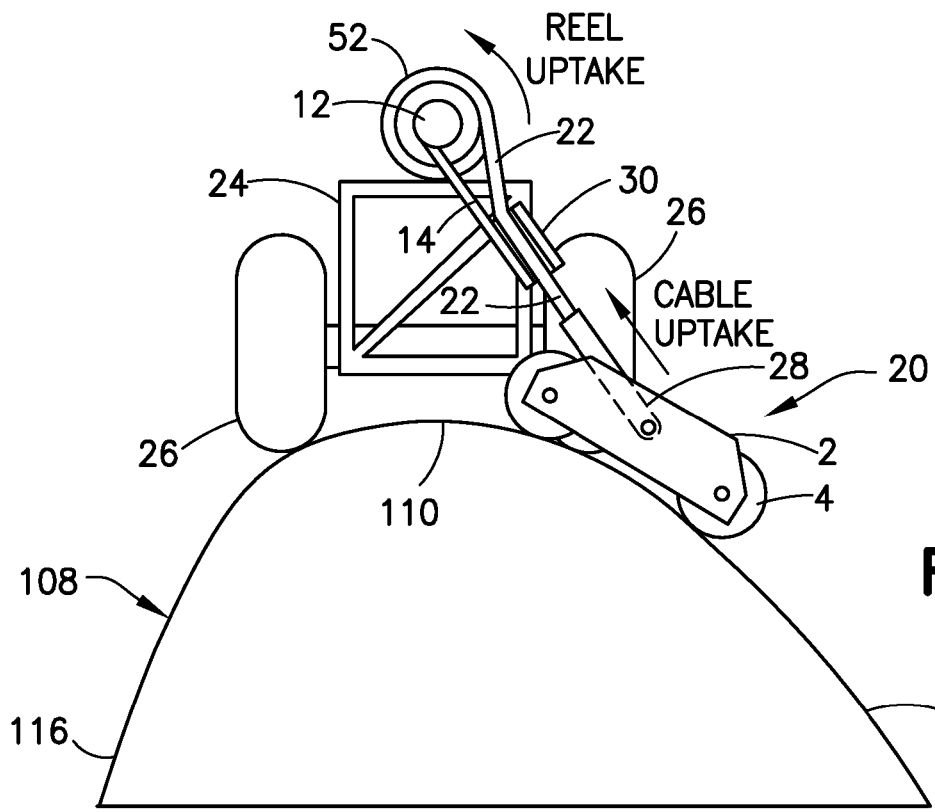

FIG. 11B depicts the automated apparatus 80 (still operating in the cable uptake mode) at a second instant in time (subsequent to the first instant in time) when the rolling elements 4 of the scan head 20 are closer to the leading edge 110 than was the case in the state depicted in FIG. 11A and the cables 22 are still being wound on the rotating cable spools 52. The continued uptake of cables 22 causes the scan head 20 (still vacuum-adhered to the side surface 114) to move upward and closer to the leading edge 110. During this continued upward movement of the scan head 20, the sensor array 6 is repeatedly activated to acquire additional NDI sensor data.

Figure 11C:
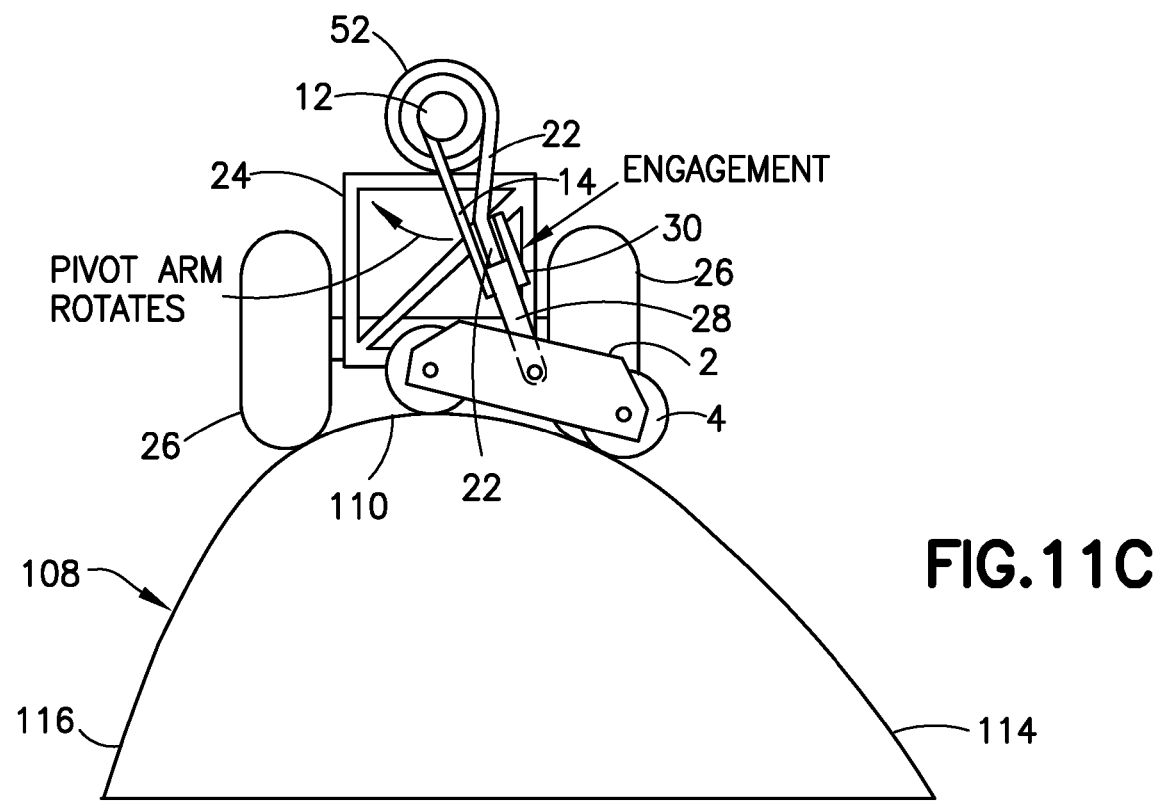

In the state depicted in FIG. 11C, a portion of each rocker brace 28 associated with the scan head 20 has entered and is in engagement with the associated receiving collet 30. FIG. 11C depicts the automated apparatus 80 at a third instant in time (subsequent to the second instant in time) when a pivot arm activation sensor (not shown in the drawings) detects that a sufficient length of each rocker brace 28 has engaged the associated receiving collet 30. In response to a first specific signal output by the pivot arm activation sensor at the third instant of time, the computer 72 exits the cable uptake mode and enters a scan head crossover mode. In particular, the computer 72 is configured to send commands to the motor controllers 70 to cause the spool motors 54 and the pivot arm motor 56 (see FIG. 18) to operate in a coordinated manner to ensure that the scan head 20 moves smoothly over the leading edge 110 of the wind turbine blade 108 without interference from or restriction by the associated cables 22.

In accordance with one aspect of the scan head crossover mode, the pivot arm motor 56 is controlled to cause rotation of the pivot spindles 12, pivot arms 14 and receiving collets 30 associated with the scan head 20. In accordance with another aspect of the scan head crossover mode, the spool motors 54 are controlled so that the associated cable spools 52 cease rotating in the "REEL UPTAKE" direction and after an interval of time start to rotate in a "REEL DE-SPOOL" direction (opposite to the "REEL UPTAKE" direction). During rotation of the pivot spindles 12 in the scan head crossover mode, the receiving collets 30 exert forces on the rocker braces 28 that cause the scan head 20 to roll so that the trailing rolling elements 4 move toward the leading edge 110 while the leading rolling elements 4 move away from the leading edge 110 and onto side surface 116 on the other side of the leading edge 110 of the wind turbine blade 108.

Figure 11D:
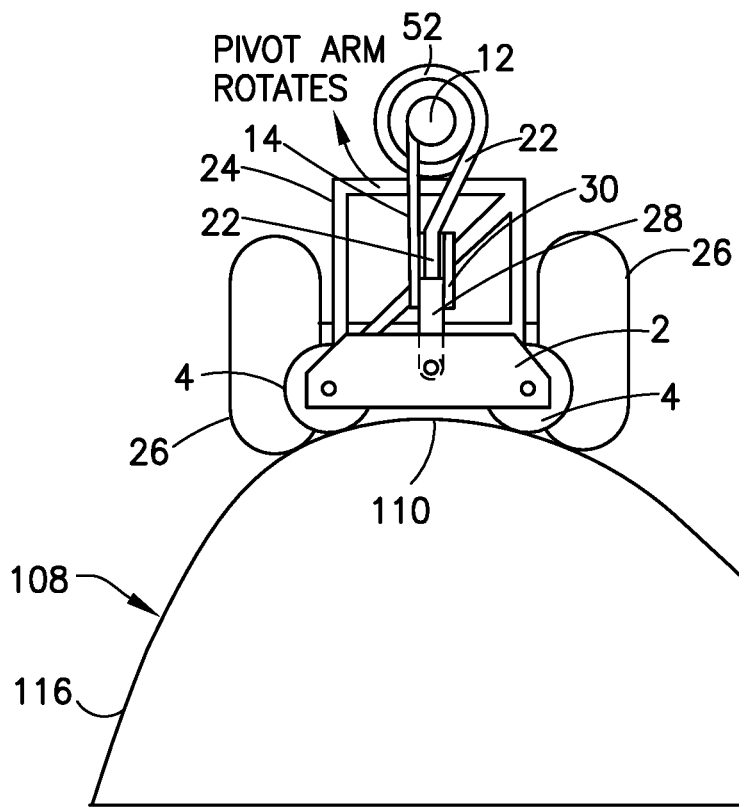

FIG. 11D depicts the automated apparatus 80 (still operating in the scan head crossover mode) at a fourth instant in time (subsequent to the third instant in time) when the scan head 20 is positioned on the leading edge 110 of the wind turbine blade 108. During the movement of the scan head 20 from the position seen in FIG. 11C to the position seen in FIG. 11D, the sensor array 6 is repeatedly activated to acquire additional NDI sensor data. In the state depicted in FIG. 11D, a portion of each rocker brace 28 continues to engage the associated receiving collet 30 as the pivot arms 14 continue to rotate. The forces being applied by the pivot arms 14 urge the scan head 20 leftward in the frame of reference of FIG. 11D.

Figure 11E:
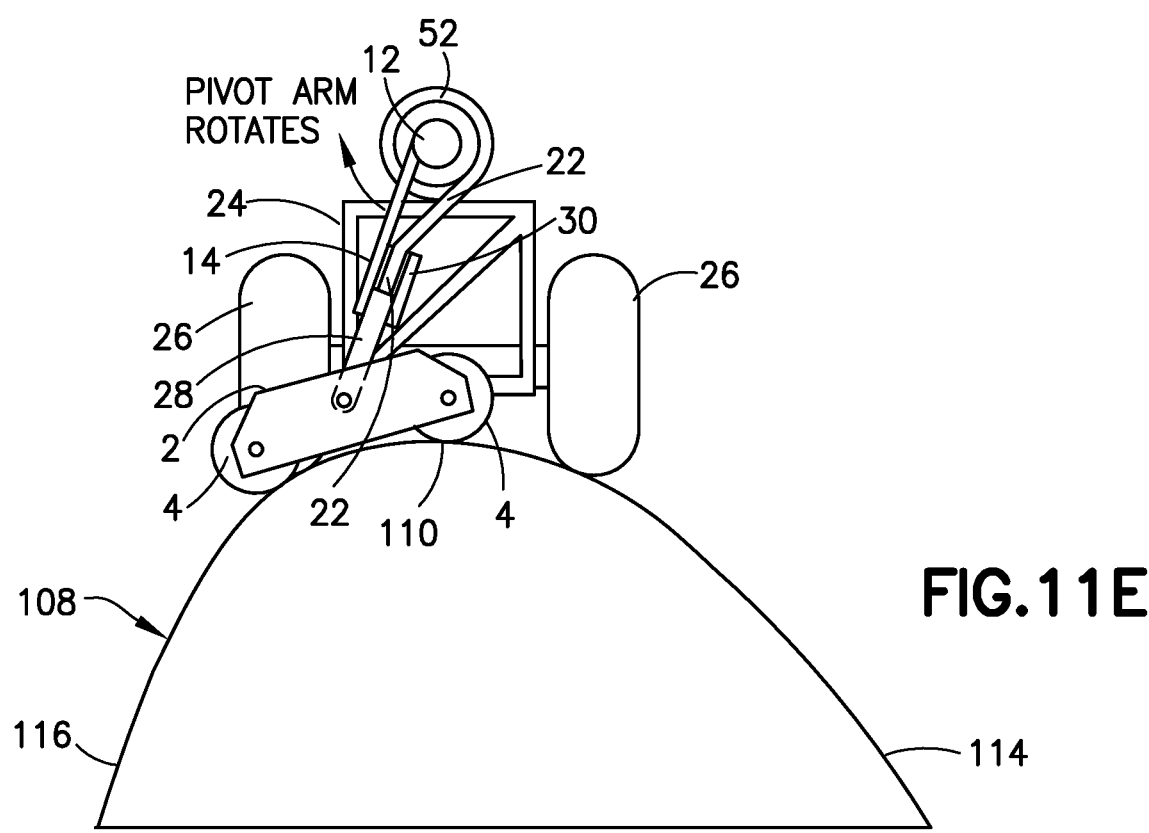

FIG. 11E depicts the automated apparatus 80 at a fifth instant in time (subsequent to the fourth instant in time) when the trailing rolling elements 4 of the scan head 20 are positioned at the leading edge 110 of the wind turbine blade 108. In response to a second specific signal (different than the first specific signal) output by the pivot arm activation sensor at the fifth instant of time, the computer 72 exits the scan head crossover mode and enters a cable splay mode.

Figure 11F:
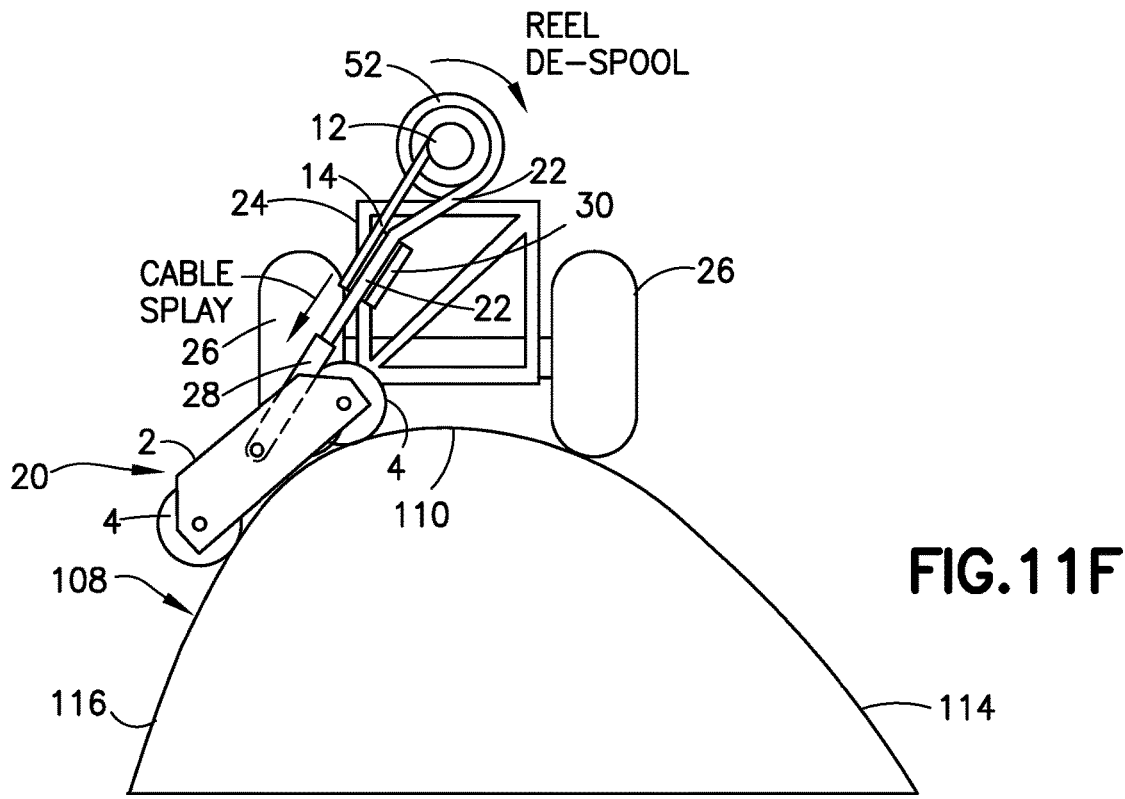

FIG. 11F depicts the automated apparatus 80 (still operating in the cable splay mode) at a sixth instant in time (subsequent to the fifth instant in time) when the rolling elements 4 of the scan head 20 are further from the leading edge 110 than was the case in the state depicted in FIG. 11E and the cables 22 are still being unwound from the cable spools 52, which cable spools 52 are now rotating in a "REEL DE-SPOOL" direction opposite to the "REEL UPTAKE" direction. The continued splay or payout of cables 22 causes the scan head 20 (now vacuum-adhered to the side surface 116) to move downward and closer to the trailing edge 112. More specifically, the computer 72 (see FIG. 18) is configured to send commands to various motor controllers 70, which motor controllers 70 in turn control the spool motors 54 to ensure that the vacuum-adhered scan head 20 moves vertically downward over the side surface 116 of the wind turbine blade 108. During this continued downward movement of the scan head 20, the sensor array 6 is repeatedly activated to acquire additional NDI sensor data.

Figure 11G:
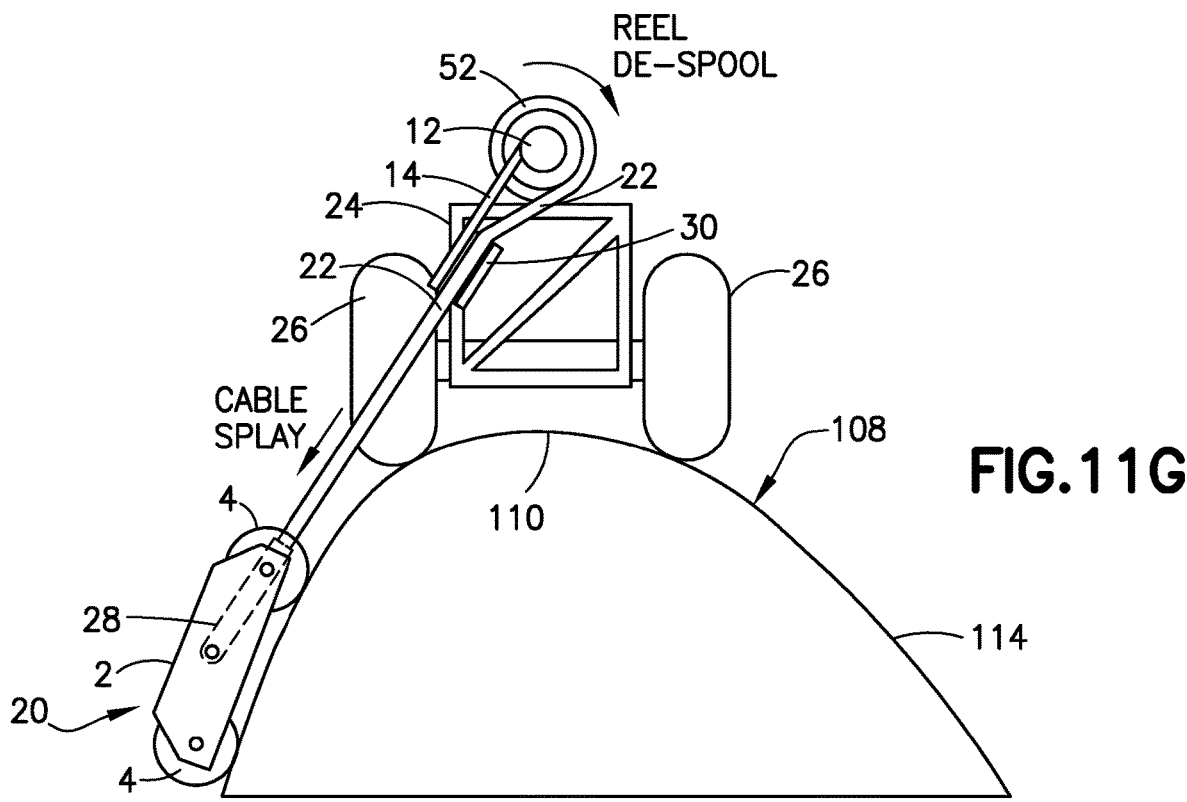

FIG. 11G depicts the automated apparatus 80 (still operating in the cable splay mode) at a seventh instant in time (subsequent to the sixth instant in time) when the rolling elements 4 of the scan head 20 are further away from the leading edge 110 than was the case in the state depicted in FIG. 11F and the cables 22 are still being unwound from the rotating cable spools 52. The continued payout of cables 22 causes the scan head 20 (still vacuum-adhered to the side surface 116) to move downward and closer to the trailing edge 112. During this continued downward movement of the scan head 20, the sensor array 6 is repeatedly activated to acquire additional NDI sensor data.

In accordance with other embodiments, a wind turbine blade 108 (or other airfoil-shaped body) may undergo non-destructive inspection while the wind turbine blade 108 is disposed in an angular position that is generally vertical instead of generally horizontal. FIG. 12 is a diagram representing a front view of a portion of a generally vertically oriented wind turbine blade 108 having an automated apparatus that is configured to non-destructively inspect both side surfaces 114 and 116 and the connecting surface area intersected by the leading edge 110.

FIG. 12 is a diagram representing a front view of a portion of a generally vertically oriented wind turbine blade 108 having multiple wheeled vehicles in the form of carriages 46a, 46b and 46c that are movably coupled to a generally horizontal flexible track 42. The flexible track 42 is wrapped around and conforms to the shape of the profile of and is attached to the surface of the generally vertically oriented wind turbine blade 108. In accordance with the proposed implementation depicted in FIG. 12, the flexible track 42 is attached to the surfaces of the wind turbine blade 108 by a multiplicity of suction cups 44 which are attached to the flexible track 42 at spaced positions along the length of the flexible track 42. As depicted in FIG. 12, excess track is allowed to extend past the trailing edge 112 of the wind turbine blade 108.

Still referring to FIG. 12, carriage 46a includes a carriage frame 36a and a drive motor 48a mounted to the carriage frame 36a, carriage 46b includes a carriage frame 36b and a drive motor 48b mounted to the carriage frame 36b, and carriage 46c includes a carriage frame 36c and a drive motor 48c mounted to the carriage frame 36c. The carriages 46a-46c may be identical in structure.

Figure 13:
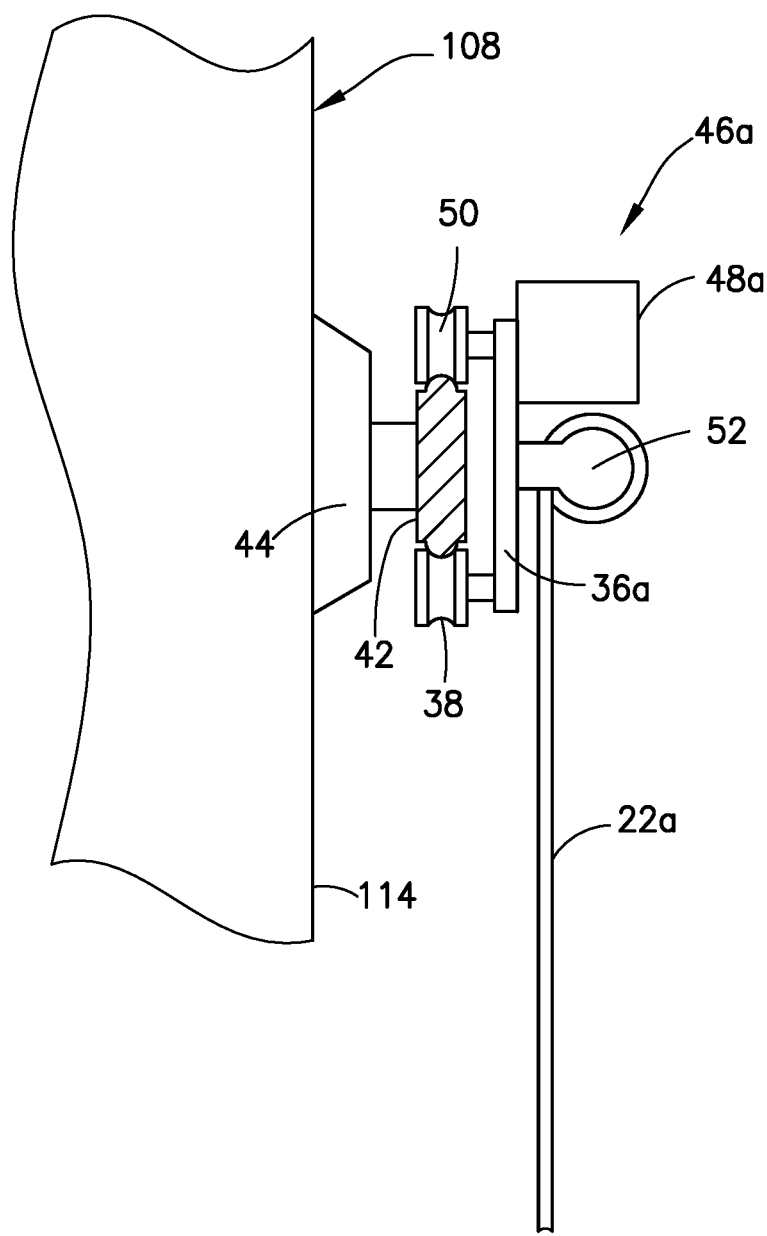
FIG. 13 is a diagram representing a sectional view of the track on which the carriages depicted in FIG. 12 are mounted. The section is taken along plane 13-13 indicated in FIG. 12.

FIG. 13 is a diagram representing a sectional view of the flexible track 42 on which the carriages 46a-46c depicted in FIG. 12 are mounted. The section is taken along plane 13-13 indicated in FIG. 12. As seen in FIG. 13, carriage 46a includes a carriage frame 36a having two pairs of wheels rotatably coupled to the carriage frame 36a, one pair of wheels which roll on one side of the flexible track 42a and another pair of wheels which roll on one side of the flexible track 42a. In the embodiment depicted in FIG. 13, the four wheels include three follower wheels 38 and one drive wheel 50. The carriage 46a is further equipped with a drive motor 48a for driving rotation of the drive wheel 50. The drive motor 48a may be controlled to drive the drive wheel 50 to rotate in either direction (into or out of the plane of the paper on which FIG. 13 is printed). Rotation of the drive wheel 50 in one rotational direction causes the carriage 46a to move along the flexible track 42 in one direction; rotation of the drive wheel 50 in an opposite rotational direction causes the carriage 46a to move along the flexible track 42 in the opposite direction.

As best seen in FIG. 12, each of the carriages 46a-46c is further equipped with a respective pair of cable spools 52 and a respective pair of spool motors 54 which respectively drive rotation of the cable spools 52. The cable spools 52 on carriage 46a have respective portions of two cables 22a and 22b wound thereon; the cable spools 52 on carriage 46b have respective portions of two cables 22c and 22d wound thereon; and the cable spools 52 on carriage 46b have respective portions of two cables 22e and 22f wound thereon. Cables 22a and 22b support a first scan head 20a; cables 22c and 22d support a second scan head 20b; and cables 22e and 22f support a third scan head not shown in FIG. 12. In the embodiment depicted in FIG. 12, each scan head 20a and 20b has a length greater than the width, the lengthwise direction of the scan head being generally parallel to the leading edge 110 when the wind turbine blade 108 is oriented generally vertically.

The flexible track 42 is wrapped around the wind turbine blade 108 in a chordwise direction and conforms to the profile of the wind turbine blade. Thus the flexible track will have a curved section that wraps around the leading edge 110 of the wind turbine blade, allowing the carriage 46a to travel from a position adjacent the side surface 114 to a position adjacent the side surface 116. As the carriage 46a moves along the flexible track 42, the vacuum-adhered scan head 20a may be displaced horizontally and repeatedly activated to acquire a swath of NDI sensor data from the confronting surfaces of the wind turbine blade 108.

Figure 14:
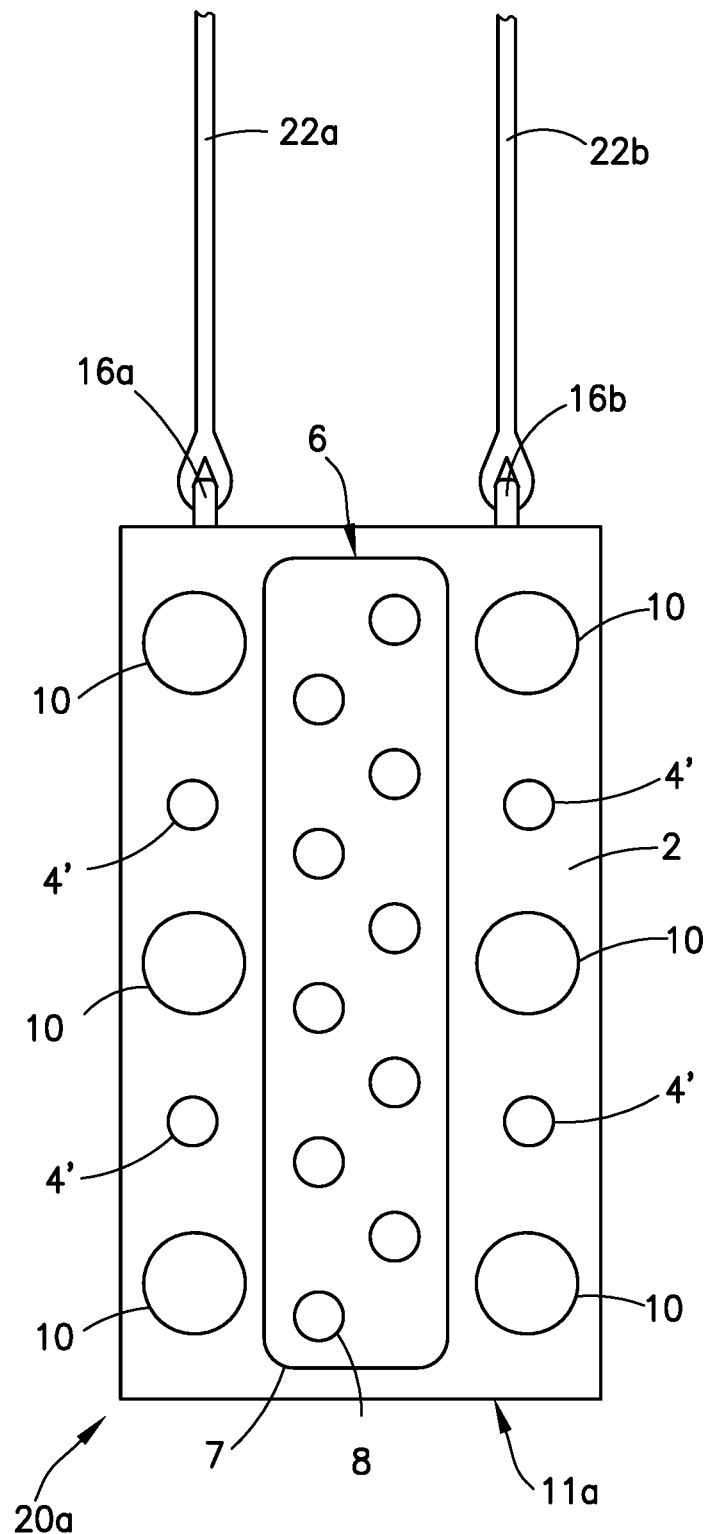
FIG. 14 is a diagram representing a front view of a scan head of a type that may be employed in the embodiment depicted in FIGS. 12 and 13.

FIG. 14 is a diagram representing a front view of a scan head 20a of a type that may be employed in the embodiment depicted in FIGS. 12 and 13. The scan head 20a depicted in FIG. 14 includes a chassis 11a that carries a sensor array 6. The chassis 11a includes a base 2, a plurality of vacuum adherence devices 10 mounted to or incorporated in the base 2, and a plurality of rolling elements 4' rollably coupled to the base 2. The scan head 20a depicted in FIG. 14 is suspended by a pair of cables 22a and 22b which, as previously described, have one end attached to a respective cable spool 52a and 52b and another end attached to the base 2 of chassis 11a by means of respective hooks 16a and 16b.

In accordance with the embodiment depicted in FIG. 14, the rolling elements 4' are ball-and-socket bearings rotatably mounted to the base 2. Such ball-and-socket bearings enable omnidirectional movement of the scan head 20a. In accordance with alternative embodiments, the rolling elements 4' are wheels having axes of rotation which perpendicular to the flexible track 42 to facilitate movement of the scan head 20 in a direction parallel to the flexible track 42.

The sensor array 6 of the scan head 20a depicted in FIG. 14 includes a conformable sensor support plank 7 and a multiplicity of sensors 8 attached to the conformable sensor support plank 7. In accordance with some embodiments, the sensors 8 are ultrasonic transducers. In accordance with other embodiments, the sensors 8 are eddy current sensors. As the scan head 20 is displaced vertically, the sensors 8 may be repeatedly activated to acquire NDI sensor data from the confronting surfaces.

Although FIG. 14 shows one configuration in which the sensor array 6 is flanked by respective rows of vacuum adherence devices 10 with four rolling elements 4' interspersed therebetween, the rolling elements 4' and vacuum adherence devices 10 may be arranged in other configurations. For example, the rolling elements 4' and vacuum adherence devices 10 may be arranged so that the sequence of elements flanking the sensor array 6 is 4'-10-4'-10-4' instead of 10-4'-10-4'-10. Other arrangements are possible. For example, in some applications the scan head 20 may be configured to not include rolling elements 4'.

In accordance with one simple embodiment, the automated apparatus depicted in FIGS. 12 and 13 may employ a single carriage 46a and a single scan head 20a suspended from that single carriage 46a. In such an embodiment, one method for performing a non-destructive inspection of an airfoil-shaped body such as a wind turbine blade 108 may be characterized by the following steps: (a) orient the airfoil-shaped body so that a leading edge of the airfoil-shaped is disposed generally vertical; (b) wrap a flexible track 42 around and attaching the flexible track 42 to the airfoil-shaped body so that the flexible track 42 lies in a generally horizontal plane; (c) couple a wheeled vehicle (e.g., carriage 46a) to the flexible track 42 in a manner so that the wheeled vehicle is movable along the flexible track 42; (d) suspend a scan head 20a from the wheeled vehicle using first and second cables 22a and 22b; (e) adhere the scan head 20a to a first non-horizontal surface of the airfoil-shaped body so that the scan head 20a is free to float across the first non-horizontal surface; (f) unwind the first and second cables 22a and 22b until the scan head 20a is suspended at an elevation; (g) while the scan head 20a is suspended at the elevation, move the wheeled vehicle generally horizontally along the flexible track 42 from a first position adjacent a first area of the first non-horizontal surface of the airfoil-shaped body to a second position adjacent to a second area of the first non-horizontal surface of the airfoil-shaped body, the second area of the first non-horizontal surface being closer to the leading edge 110 of the airfoil-shaped body than is the first portion of the first non-horizontal surface; (h) use the scan head 20a to acquire sensor data from the first non-horizontal surface of the airfoil-shaped body as the wheeled vehicle moves from the first position to the second position; (i) while the scan head 20a is suspended at the elevation, move the wheeled vehicle generally horizontally along the flexible track 42 from the second position to a third position adjacent a first area of a second non-horizontal surface of the airfoil-shaped body; (j) use the scan head 20a to acquire sensor data from a third non-horizontal surface of the airfoil-shaped body which is intersected by the leading edge 110 as the wheeled vehicle moves from the second position to the third position; (k) while the scan head 20a is suspended at the elevation, move the wheeled vehicle generally horizontally along the flexible track 42 from the third position to a fourth position adjacent a second area of the second non-horizontal surface of the airfoil-shaped body, the first area of the second non-horizontal surface being closer to the leading edge than is the second area of the second non-horizontal surface; and (l) use the scan head to acquire sensor data from the second non-horizontal surface of the airfoil-shaped body as the wheeled vehicle moves from the third position to the fourth position.

In accordance with another embodiment, the automated apparatus depicted in FIGS. 12 and 13 may employ two carriages 46a and 46b and two scan heads 20a and 20b respectively suspended from the two carriages 46a and 46b. In such an embodiment, one method for performing a non-destructive inspection of an airfoil-shaped body such as a wind turbine blade 108 may be characterized by the following steps: (a) orient the airfoil-shaped body so that a leading edge of the airfoil-shaped is disposed generally vertical; (b) wrap a flexible track 42 around and attaching the flexible track 42 to the airfoil-shaped body so that the flexible track 42 lies in a generally horizontal plane; (c) couple a first wheeled vehicle to the flexible track 42 in a manner so that the wheeled vehicle is movable along the flexible track 42; (d) suspend a first scan head 20a from the first wheeled vehicle using first and second cables 22a and 22b; (e) adhere the first scan head 20a to a first non-horizontal surface of the airfoil-shaped body so that the first scan head 20a is free to float across the first non-horizontal surface; (f) unwind the first and second cables 22a and 22b until the first scan head 20a is suspended at a first elevation; (g) while the first scan head 20a is suspended at the first elevation, move the first wheeled vehicle generally horizontally along the flexible track 42 from a first position adjacent a first area of the first non-horizontal surface of the airfoil-shaped body to a second position adjacent to a second area of the first non-horizontal surface of the airfoil-shaped body, the second area of the first non-horizontal surface being closer to the leading edge 110 of the airfoil-shaped body than is the first portion of the first non-horizontal surface; (h) use the first scan head 20a to acquire sensor data from the first non-horizontal surface of the airfoil-shaped body as the first wheeled vehicle moves from the first position to the second position; (i) couple a second wheeled vehicle to the flexible track 42 in a manner so that the second wheeled vehicle is movable along the flexible track 42; (j) suspend a second scan head 20b from the second wheeled vehicle using third and fourth cables 22c and 22d; (k) adhere the second scan head 20b to a second non-horizontal surface of the airfoil-shaped body so that the second scan head 20b is free to float across the second non-horizontal surface; (l) unwind the third and fourth cables 22c and 22d until the second scan head 20b is suspended at a second elevation; (m) while the second scan head 20b is suspended at the second elevation, move the second wheeled vehicle generally horizontally along the flexible track 42 from a third position adjacent a first area of the second non-horizontal surface of the airfoil-shaped body to a fourth position adjacent to a second area of the second non-horizontal surface of the airfoil-shaped body, the first area of the second non-horizontal surface being closer to the leading edge of the airfoil-shaped body than is the second area of the second non-horizontal surface; and (n) use the second scan head 20b to acquire sensor data from the second non-horizontal surface of the airfoil-shaped body as the second wheeled vehicle moves from the third position to the fourth position, wherein the first and second scan heads 20a and 20b acquire sensor data concurrently while the first and second wheeled vehicles are moving concurrently along the flexible track 42.

In accordance with the method characterized in the preceding paragraph, a pair of scan heads 20a and 20b vacuum-adhered to opposite side surfaces 114 and 116 of the airfoil-shaped body (e.g., a wind turbine blade 108) may concurrently each follow a respective serpentine scan path designed to cover an entire respective side surface. For example, the carriage drive motor 50 and spool motor 52 mounted on carriage 46a and the sensor array 6 carried by the scan head 20a may be operated to achieve the following first serpentine scan path: (a) while the scan head is at a first elevation, move the carriage 46a from a first position along flexible track 42 to a second position on the flexible track; (b) as the carriage 46a moves from the first position to the second position and as the scan head 20a moves in parallel with the carriage 46a, activate the sensor array 6 carried by the scan head 20a to acquire a first swath of NDI sensor data from a first stripe-shaped surface area; (c) while the carriage is stopped at the second position, lower the scan head 20a to a second elevation by unwinding the cables 22a and 22b by a length approximately equal to a width of the sensor array 6; (d) while the scan head 20a is at the second elevation, move the carriage 46a from the second position back to the first position; (e) as the carriage 46a moves from the second position back to the first position and as the scan head 20a moves in parallel with the carriage 46a, activate the sensor array 6 carried by the scan head 20a to acquire a second swath of NDI sensor data from a second stripe-shaped surface area (which is parallel to and contiguous with the first second stripe-shaped surface area; (f) while the carriage is stopped at the first position, lower the scan head 20a to a third elevation by unwinding the cables 22a and 22b by a length approximately equal to the width of the sensor array 6; (g) while the scan head 20a is at the third elevation, move the carriage 46a from the first position back to the second position; (h) as the carriage 46a moves from the first position back to the second position and as the scan head 20a moves in parallel with the carriage 46a, activate the sensor array 6 carried by the scan head 20a to acquire a third swath of NDI sensor data from a third stripe-shaped surface area (which is parallel to and contiguous with the second stripe-shaped surface area; and so forth. The swaths of NDI sensor data are then stitched together by a computer configured with image processing software and displayed on a display monitor. The carriage drive motor 50 and spool motor 52 mounted on carriage 46b and the sensor array 6 carried by the scan head 20*b* may be operated in a similar manner to acquire NDI sensor data on a second serpentine scan path which is a mirror image of the first serpentine scan path.

Figure 17:
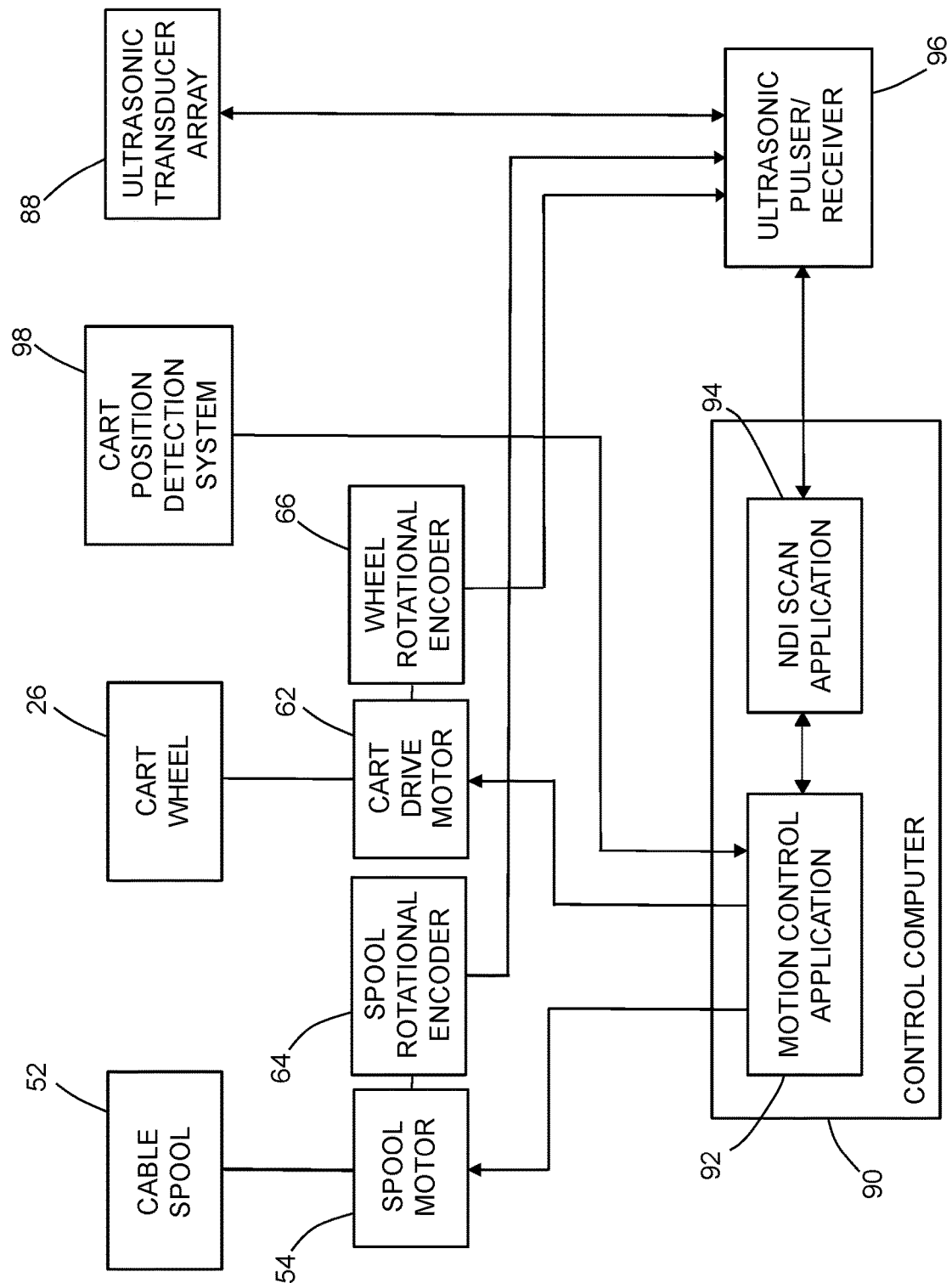
FIG. 17 is a block diagram identifying some components of a computer-controlled apparatus for performing an ultrasonic inspection operation on a wind turbine blade in accordance with either embodiment depicted in FIGS. 2 and 5.

In accordance with some embodiments, the sensor arrays 6 may be ultrasonic transducer arrays 88. FIG. 17 is a block diagram identifying some components of a computer-controlled apparatus for performing an ultrasonic inspection operation on a wind turbine blade 108 in accordance with either of the embodiments depicted in FIGS. 2 and 5. The system includes a control subsystem that uses rotation encoders to track the relative location (e.g., relative to an initial location acquired using a local positioning system that includes a laser range meter) of each ultrasonic transducer array 88. More specifically, the control system includes a ground-based control computer 90 programmed with motion control application software 92 and NDI scan application software 94. The control computer 90 communicates with a respective motor controller (not shown) that controls operation of a respective spool motor 54. Each spool motor 54 in turn may be operated to drive rotation of a respective cable spool 52 during winding or unwinding of a respective pair of cables 22. The control computer 90 also communicates with a motor controller (not shown) that controls operation of a cart drive motor 62. The cart drive motor 62 in turn may be operated to drive rotation of one of the cart wheels 26. Rotation of the driven cart wheel 26 drives displacement of the cart 18 along the leading edge 110 of the wind turbine blade 108. More specifically, the cart drive motor 62 may be coupled to the cart wheel 26 in a manner that allows the cart 18 to be selectively driven to displace either away from or toward the hub 106 of the wind turbine 100.

In accordance with one proposed implementation, each spool motor 54 and the cart drive motor 62 are stepper motors. The control computer 90 may comprise a general-purpose computer programmed with motion control application software 92 comprising respective software modules for controlling each spool motor 54 and the cart drive motor 62. The motion control application 92 controls the operation of the motors based on rotation feedback from respective rotational encoders, namely, spool rotational encoder 64 and cart wheel rotational encoder 66. The rotational counts from the encoders are converted into linear measurements. More specifically, a count from the spool rotational encoder 64 represents a distance traveled by the scan head 20 in a vertical or chordwise direction, whereas a count from the cart wheel rotational encoder 66 represents a distance traveled by the cart 18 in a horizontal or spanwise direction. In one embodiment, the control computer 90 is connected to the motors and encoders via an electronics box (not shown in FIG. 17) and a power/signal cord (not shown) that connects the ground control workstation with the cart 18 on the wind turbine blade 108. The electronics box contains the system power supplies and integrates all the scan head control connections and provides an interface between the control computer 90 and the power/signal cord 60 (see. e.g., FIG. 4).

In another embodiment, the control computer 90 communicates wirelessly with the cart 18 via a wireless system such as a radio frequency (RF) system. Inspection information can then be transmitted wirelessly from the cart 18 to the control computer 90 in real-time to enable the remote operator to visually observe the inspection of the wind turbine blade 108 in real-time. In other embodiments, the scan heads 20 may communicate wirelessly and directly with the control computer 90, receiving ultrasonic transducer activation signals and transmitting acquired ultrasonic inspection data individually.

In accordance with one variation of a wireless embodiment, the cart 18 includes power supplies, e.g., batteries, to drive the various motors to position the cart 18 and the scan heads 20 to perform an inspection of the wind turbine blade 108. In this case the scan heads 20 receive power from the cart 18 by way of respective power/signal cords 60. In the alternative, the cart 18 and scan heads 20 may be provided with transceivers for enabling control signals to be sent wirelessly from the cart 18 to each scan head 20 and inspection information to be sent wirelessly from each scan head 20 to the cart 18, thus eliminating power/signal cords 60.

The encoded data from the spool rotational encoder 64 and cart wheel rotational encoder 66 onboard the cart 18 is provided to an ultrasonic pulser/receiver 96, which may be mounted on the cart 18 or at the control workstation. In the former case, the inspection information from the scan heads 20 may be sent to the ultrasonic pulser/receiver 96 onboard the cart 18 via respective power/signal cords 60 or wirelessly. In the latter case, the encoded data from the spool rotational encoder 64 and cart wheel rotational encoder 66 onboard the cart 18 may be sent to the ultrasonic pulser/receiver 96 on the ground via a cable or a wireless communication channel.

Still referring to FIG. 17, the pulser/receiver 96 sends the encoder pulses to the NDI scan application 94. The NDI scan application 94 uses the encoder values to position the scan data in the proper location. The control computer 90 hosts ultrasonic data acquisition and display software that controls the ultrasonic pulser/receiver 96. The ultrasonic pulser/receiver 96 in turn sends pulses to and receives return signals from the ultrasonic transducer array 88. The NDI scan application software 94 controls all details of the scan data and the display of data, including the stitching of data acquired during adjacent sweeps of the ultrasonic transducer arrays 88.

The system depicted in FIG. 17 further includes a cart position detection system 98 that is configured to acquire cart position data representing the initial coordinate position of the cart 18 relative to a coordinate system (i.e., frame of reference) of the wind turbine blade 108. Once the initial coordinate position of the cart 18 has been determined, the data acquired by the cart wheel rotational encoder 66 can be used to track each incremental movement away or toward the initial coordinate position. This enables the control computer 90 to track the spanwise position of the cart 18 during the performance of a non-destructive inspection on the wind turbine blade 108.

The cart position detection system 98 may take many different forms. For example, the cart position detection system 98 may include a string encoder mounted on the cart 18. The string encoder includes a string having one end which may be attached to a string encoder attachment device fixedly coupled to the root of the wind turbine blade 108. The string encoder can be used to measure the distance of the cart 18 from the hub 106, which in turn enables determination of the spanwise position of the cart 18 on the wind turbine blade. In scanning scenarios in which the scan heads 20 sweep along adjacent chordwise scan paths, the control computer 90 can be configured to determine and map the spanwise position along the wind turbine blade 108 of each scan head 20, based in part on the spanwise position of the cart 18, and then use that position mapping for each scan head 20 to stitch acquired NDI sensor data together for the purpose of imaging a scanned region.

In accordance with an alternative embodiment, the cart position detection system 98 may include a laser range meter mounted on the hub 106 of the wind turbine 100 and an optical target (e.g., a retroreflector) mounted on the cart 18 (or vice versa). The control computer 90 may be programmed to control operation of the laser range meter and receive range data therefrom for wireless transmission to a control station. Measurement data from the laser range meter can be used to obtain estimates of the distance from the laser range meter to the optical target, which distance can be used to compute the spanwise position of the cart 18 in the frame of reference of the wind turbine blade 108. A typical laser range meter comprises a laser diode which transmits a bundled, usually visible, laser beam toward the optical target. The light which is backscattered and/or reflected by the optical target is imaged on the active surface of a photoreceiver by receiving optics. The photoreceiver has a position and an orientation which are fixed relative to the position and orientation of the laser diode. The time-of-flight between transmission and reception of the light can be used to calculate the distance between the laser range meter and the optical target. Alternatively, a distance meter which directionally projects wave energy other than a laser beam could be utilized.

In accordance with a further embodiment, the cart position detection system 98 may include closed-loop feedback control using a motion capture system of the type disclosed in detail in U.S. Pat. No. 7,643,893. In accordance with one embodiment, the motion capture system is configured to measure the spanwise position of the cart 18 as the cart 18 operates within a control volume. A processor receives the measured motion characteristics from the motion capture system and determines a control signal based on the measured motion characteristics. A position control system receives the control signal and continuously adjusts the cart motion to maintain or achieve a desired motion state. The cart 18 may be equipped with optical targets in the form of passive retro-reflective markers. The motion capture system, the processor, and the position control system comprise a complete closed-loop feedback control system.

During the performance of a non-destructive inspection, the concurrent movements of a multiplicity of scan heads 20 may be tracked using any one of a variety of scan head position detection systems. Knowing where each scan head 20 is located at any time is important. For example, in cases where the sensors 8 are ultrasonic transducers, the locations of the sensor arrays 6 are correlated with the acquired NDI sensor data to ensure full coverage and potentially create an NDI map of the surface of the wind turbine blade. Along-blade positioning (i.e., in a spanwise direction) is done using measurements already discussed. Across-blade positioning (i.e., in a chordwise direction) can be done in the following ways:

(a) String encoders extending from the cart 18 to each scan head 20 may be used.

(b) Wheel rotational encoders on each scan head 20 may be used to track vertical motion if the rolling elements 4 are wheels.

(c) Laser-based methods may be used. For example, a laser-based scan head position detection system may include laser range meters mounted on the cart 18 and aimed at optical targets mounted on each scan head 20. To enable lines-of-sight to be maintained, the laser devices may be mounted on the distal ends of robotic (e.g., articulated) arms that extend from each side of the cart 18, while the optical targets are mounted on the scan heads 20 in a manner such that the emitted laser beams impinge on those optical targets.

(d) Camera- or video-based methods may be used, such as motion capture using optical targets mounted on each scan head 20.

(e) Rotational encoders coupled to the cable spools 52 may be used to provide the across-blade location determination.

Figure 18:
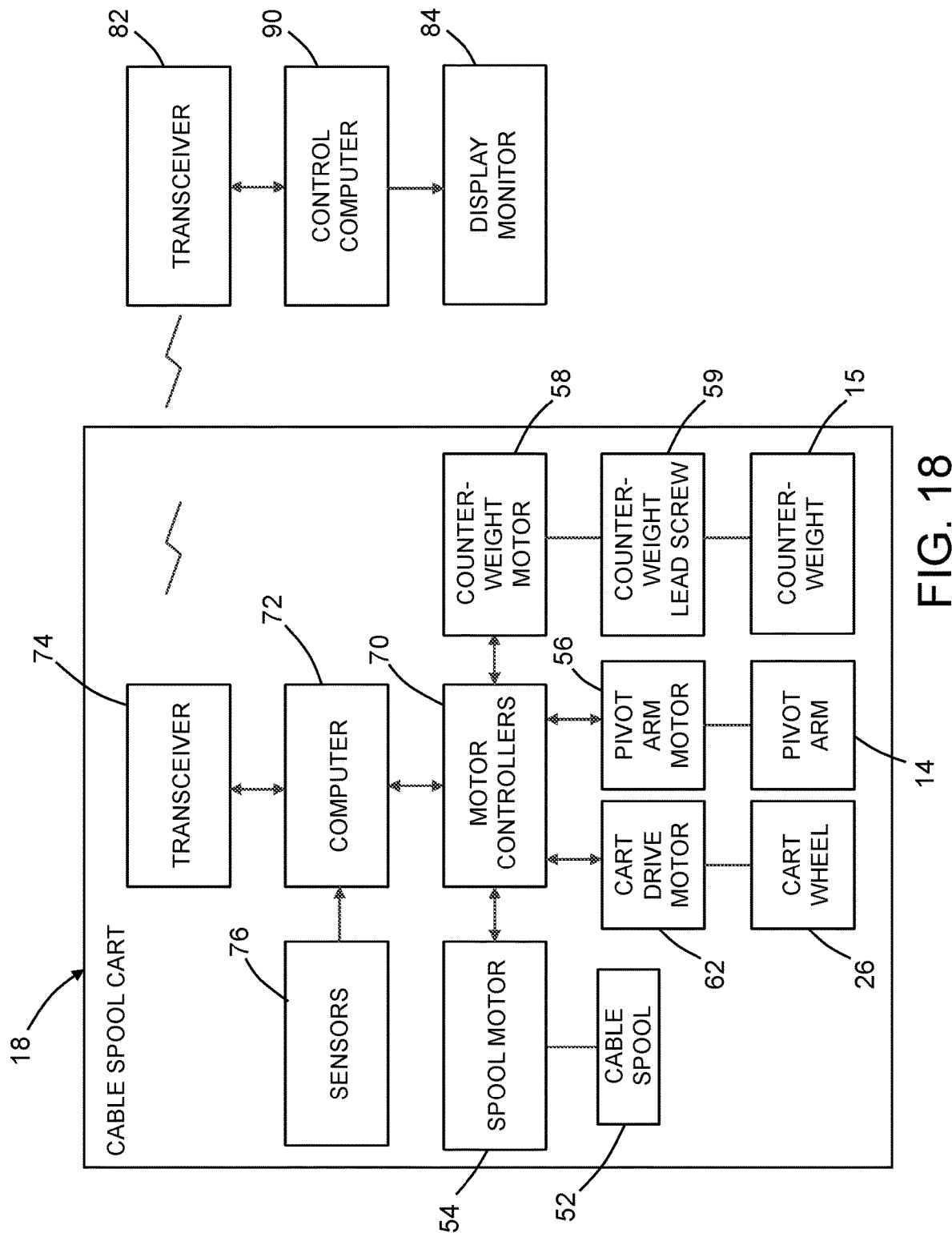
FIG. 18 is a block diagram identifying some components of a computer-controlled apparatus for performing a non-destructive inspection operation on a wind turbine blade in accordance with the embodiment depicted in FIGS. 9 and 10.

FIG. 18 is a block diagram identifying some components of a computer-controlled apparatus for performing a non-destructive inspection operation on a wind turbine blade using a cart 16 in accordance with the embodiment depicted in FIGS. 9 and 10. In this example, the components of the cart 18 are controlled by an onboard computer 72, which may be configured with programming stored in a non-transitory tangible computer-readable storage medium (not shown). In particular, the computer 72 may be programmed to execute radiofrequency commands received from a ground-based control computer 90. Those radiofrequency commands are transmitted by a transceiver 82 which is communicatively coupled to the ground-based control computer 90, received by a transceiver 74 onboard the cart 16, converted into the proper digital format and then forwarded to the onboard computer 72.

The control computer 90 may comprise a general-purpose computer system configured with programming for controlling operation of the cart 16. For example, the control computer 90 may send scan path commands to computer 72 for controlling the operation of spool motors 54 and cart drive motor 62 by way of respective motor controllers 70. In response to receipt of the scan path commands, the computer 72 onboard the cart is configured to control the operation of spool motors 54 and cart drive motor 62 so that the scan head 20 follows a specified scan path. The control computer 90 may also be configured to control activation of the sensor arrays 6 (not depicted in FIG. 18) carried by the scan heads 20 as the scan heads follow the specified scan path.

In addition, the control computer 90 is configured with programming for processing data received from the cart 18 via transceivers 74 and 82 during an inspection operation. In particular, the control computer 90 may comprise a display processor configured with software for controlling a display monitor 84 to display images representing the acquired NDO sensor data.

In addition, the onboard computer 72 is further configured to issue commands to respective motor controller 70 for controlling the operation of the pivot arm motor 56 and the counterweight motor 58, which commands are triggered by feedback from respective sensors 76 which respectively monitor the state of imbalance of the cart 18 and the positional relationship of the rocker brace 28 and the receiving collet 30 for a respective scan head 20. More specifically, the multiplicity of sensors 76 includes (but is not limited to): (1) a pivot arm activation sensor which detects when a sufficient length of each rocker brace 28 has engaged the associated receiving collet 30 to enable the pivot arm 14 to effectively manipulate the scan head 20; and (2) a cart imbalance sensor which detects when the cart 18 is being pulled from its equilibrium position by an unbalancing force greater than a specified threshold. When the rocker braces 28 are engaged with the receiving collets 30, the computer 72 activates the pivot arm motor 56, causing the pivot arm 14 to rotate. When the cart 18 has become sufficiently unbalanced, the computer 72 activates the counterweight motor 58, causing the counterweight lead screw 59 to rotate, which in turn displaces the counterweight 15 to a position calculated to offset the unbalancing force.

While apparatus and methods for large-area scanning of wind turbine blades or other large-bodied structures (such as aircraft fuselages and wings) for the purpose of non-destructive inspection have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An automated apparatus for performing a non-destructive inspection of a body, comprising:
   a wheeled vehicle comprising a frame, a multiplicity of wheels rotatably coupled to the frame, and a drive motor operatively coupled for driving rotation of at least one wheel of the multiplicity of wheels;
   a first spool rotatably coupled to the frame;
   a spool motor mounted to the frame and operatively coupled for driving rotation of the first spool;
   a first chassis comprising a base and at least one vacuum adherence device mounted to or incorporated in the base of the first chassis;
   a first cable having one end attached to the first spool and another end attached to the base of the first chassis;
   a second cable having one end attached to the first spool and another end attached to the base of the first chassis;
   a first sensor array comprising a flexible substrate attached to the base of the first chassis and a multiplicity of sensors attached to the flexible substrate; and
   a computer system configured to control operation of the drive motor, the spool motor and the first sensor array to acquire sensor data over a first scan area on a surface of a body,
   wherein the at least one vacuum adherence device is configured to produce floating adherence to the surface of the body.

2. The automated apparatus as recited in claim 1, further comprising a multiplicity of rolling elements rotatably coupled to the first chassis, wherein:
   the multiplicity of rolling elements are configured to all contact the surface of the body concurrently;
   the at least one vacuum adherence device is configured to produce floating adherence to the surface of the body when the rolling elements of the first chassis are in contact with the surface of the body; and
   the first sensor array is directed toward the first scan area on the surface of the body when the rolling elements of the first chassis are in contact with the surface of the body.

3. The automated apparatus as recited in claim 1, wherein rolling elements of the first chassis are not operatively coupled to any motors.

4. The automated apparatus as recited in claim 1, wherein a first vacuum adherence device of the at least one vacuum adherence device is incorporated in the base of the first chassis on one side of the flexible substrate and a second vacuum adherence device of the at least one vacuum adherence device is incorporated in the base of the first chassis on another side of the flexible substrate.

5. The automated apparatus as recited in claim 4, wherein the multiplicity of sensors are ultrasonic transducers or eddy current sensors.

6. An automated apparatus for performing a non-destructive inspection of a body, comprising:
   a wheeled vehicle comprising a frame, a multiplicity of wheels rotatably coupled to the frame, and a drive motor operatively coupled for driving rotation of at least one wheel of the multiplicity of wheels;
   a first spool rotatably coupled to the frame;
   a first spool motor mounted to the frame and operatively coupled for driving rotation of the first spool;
   a first chassis comprising a base and a first vacuum adherence device mounted to or incorporated in the base of the first chassis;
   a first cable having one end attached to the first spool and another end attached to the base of the first chassis;
   a second cable having one end attached to the first spool and another end attached to the base of the first chassis;
   a first sensor array attached to the base of the first chassis;
   a second spool rotatably coupled to the frame;
   a second spool motor mounted to the frame and operatively coupled for driving rotation of the second spool;
   a second chassis comprising a base and a second vacuum adherence device mounted to or incorporated in the base of the second chassis;
   a third cable having one end attached to the second spool and another end attached to the base of the second chassis;
   a fourth cable having one end attached to the second spool and another end attached to the base of the second chassis;
   a second sensor array attached to the base of the second chassis; and
   a computer system configured to control operation of the drive motor, the first and second spool motors, and the first and second sensor arrays to acquire sensor data over first and second scan areas on a surface of the body,
   wherein the first and second vacuum adherence devices are configured to produce floating adherence to the surface of the body.

7. An automated apparatus for performing a non-destructive inspection of a body, comprising:

a wheeled vehicle comprising a frame, a multiplicity of wheels rotatably coupled to the frame, and a drive motor operatively coupled for driving rotation of at least one wheel of the multiplicity of wheels;

a spool rotatably coupled to the frame;

a spool motor mounted to the frame and operatively coupled for driving rotation of the spool;

a first chassis comprising a base and a first vacuum adherence device mounted to or incorporated in the base of the first chassis;

a first cable having one end attached to the spool and another end attached to the base of the first chassis;

a second cable having one end attached to the spool and another end attached to the base of the first chassis;

a first sensor array attached to the base of the first chassis;

a second chassis comprising a base and a second vacuum adherence device mounted to or incorporated in the base of the second chassis;

a third cable having one end attached to the spool and another end attached to the base of the second chassis;

a fourth cable having one end attached to the spool and another end attached to the base of the second chassis; and a second sensor array attached to the base of the second chassis; and a computer system configured to control operation of the drive motor, the spool motor, and the first and second sensor arrays to acquire sensor data over first and second scan areas on a surface of the body, wherein the first and second vacuum adherence devices are configured to produce floating adherence to the surface of the body.

8. The automated apparatus as recited in claim 1, further comprising a counterweight slidably coupled to the frame for adjusting a position of the counterweight that counterbalances, at least in part, a force exerted on the wheeled vehicle by a weight of the first chassis and the first sensor array.

9. A method for performing a non-destructive inspection of a body, the method comprising:
(a) coupling a wheeled vehicle to a body in a manner so that the wheeled vehicle is movable relative to the body in a generally horizontal direction;
(b) suspending a first scan head from the wheeled vehicle using first and second cables;
(c) adhering the first scan head to a first non-horizontal surface on one side of a body so that the first scan head is free to float across the first non-horizontal surface;
(d) unwinding or winding the first and second cables to cause the first scan head to displace vertically while the first scan head is adhered to the first non-horizontal surface;
(e) using the first scan head to acquire first NDI sensor data from the first non-horizontal surface of the body as the first scan head moves vertically;
(f) suspending a second scan head from the wheeled vehicle using third and fourth cables;
(g) adhering the second scan head to a second non-horizontal surface of the body so that the second scan head is free to float across the second non-horizontal surface while adhered to the second non-horizontal surface;
(h) unwinding or winding the third and fourth cables to cause the second scan head to displace vertically; and
(i) using the second scan head to acquire second NDI sensor data from the second non-horizontal surface of the body as the second scan head moves vertically.

10. The method as recited in claim 9, wherein steps (e) and (i) are performed concurrently.

11. The method as recited in claim 9, wherein step (a) comprises placing the wheeled vehicle on a generally horizontal surface of the body that connects the first and second non-horizontal surfaces of the body.

12. The automated apparatus as recited in claim 1, wherein the flexible substrate is made of semi-rigid rubber reinforced with carbon or nylon rods.

13. The method as recited in claim 9, wherein the first and second scan heads comprise respective arrays of ultrasonic transducers.

14. The method as recited in claim 9, wherein the first and second scan heads comprise respective arrays of eddy current sensors.

15. The method as recited in claim 9, wherein the first and second NDI sensor data are acquired using an NDI method taken from a group that includes optical imaging, infrared thermography, laser shearography, and digital radiography.

16. The automated apparatus as recited in claim 1, further comprising:
a second spool rotatably coupled to the frame;
a second chassis comprising a base and at least one vacuum adherence device mounted to or incorporated in the base of the second chassis;
a third cable having one end attached to the second spool and another end attached to the base of the second chassis;
a fourth cable having one end attached to the second spool and another end attached to the base of the second chassis; and
a second sensor array attached to the base of the second chassis.

17. The automated apparatus as recited in claim 1, further comprising:
a second chassis comprising a second base and at least one second vacuum adherence device mounted to or incorporated in the base of the second chassis;
a third cable having one end attached to the spool and another end attached to the base of the second chassis;
a fourth cable having one end attached to the spool and another end attached to the base of the second chassis; and
a second sensor array attached to the second chassis base.

18. The automated apparatus as recited in claim 1, wherein the sensor data is taken from a group that includes optical imaging data, infrared thermography data, laser shearography data, and digital radiography data.

19. The automated apparatus as recited in claim 6, wherein the first sensor array comprises a conformable sensor support plank attached to the base of the first chassis and a multiplicity of sensors attached to the conformable sensor support plank.

20. The automated apparatus as recited in claim 7, wherein the first sensor array comprises a conformable sensor support plank attached to the base of the first chassis and a multiplicity of sensors attached to the conformable sensor support plank.

* * * * *